United States Patent
Meylan et al.

(10) Patent No.: US 12,028,807 B2
(45) Date of Patent: *Jul. 2, 2024

(54) DISCONTINUOUS RECEPTION WAKEUP TECHNIQUES

(71) Applicant: QUALCOMM Incorporated, San Diego, CA (US)

(72) Inventors: Arnaud Meylan, San Diego, CA (US); Paolo Minero, La Jolla, CA (US); Zae Yong Choi, San Jose, CA (US); Scott Hoover, Del Mar, CA (US); Zhong Fan, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,284

(22) Filed: Jun. 30, 2022

(65) Prior Publication Data

US 2022/0408356 A1    Dec. 22, 2022

Related U.S. Application Data

(63) Continuation of application No. 16/935,033, filed on Jul. 21, 2020, now Pat. No. 11,405,864.
(Continued)

(51) Int. Cl.
*H04W 52/02* (2009.01)
*H04W 72/21* (2023.01)

(52) U.S. Cl.
CPC ....... *H04W 52/0216* (2013.01); *H04W 72/21* (2023.01)

(58) Field of Classification Search
None
See application file for complete search history.

(56) References Cited

U.S. PATENT DOCUMENTS

| 8,755,313 B2 | 6/2014 | Damnjanovic et al. |
| 11,405,864 B2 * | 8/2022 | Meylan ................ H04W 72/21 |

(Continued)

FOREIGN PATENT DOCUMENTS

| WO | WO-2008086532 | 7/2008 |
| WO | WO-2019037127 A1 | 2/2019 |
| WO | WO-2019083096 A1 | 5/2019 |

OTHER PUBLICATIONS

International Search Report and Written Opinion—PCT/US2020/043064—ISA/EPO—dated Nov. 2, 2020.

*Primary Examiner* — Hassan A Phillips
*Assistant Examiner* — Gautam Sharma
(74) *Attorney, Agent, or Firm* — Holland & Hart / Qualcomm

(57) ABSTRACT

Methods, systems, and devices for wireless communications are described in which a user equipment (UE) may wake up from a sleep mode of a discontinuous reception (DRX) cycle based on receipt of uplink data. The UE may determine if an elapsed time between a prior receipt of one or more reference signals and an uplink transmission to the base station after waking up from the sleep mode is less than a threshold time value. If the elapsed time is less than the threshold time value, the UE may transmit an uplink transmission associated with the received uplink data prior to receiving one or more reference signals that may be used to update transmission parameters for uplink transmissions. If the elapsed time is at or above the threshold value, the UE may wait to receive the one or more reference signals and update the transmission parameters prior to the uplink transmission.

30 Claims, 16 Drawing Sheets

Related U.S. Application Data

(60) Provisional application No. 62/877,429, filed on Jul. 23, 2019.

(56) References Cited

U.S. PATENT DOCUMENTS

| | | |
|---|---|---|
| 2013/0034035 A1 | 2/2013 | Kazmi et al. |
| 2015/0334656 A1 | 11/2015 | Ji et al. |
| 2016/0044541 A1* | 2/2016 | Lunden ................ H04W 24/08 370/252 |
| 2018/0279408 A1 | 9/2018 | Jha et al. |
| 2019/0059054 A1 | 2/2019 | Lee et al. |
| 2019/0069271 A1 | 2/2019 | Reial et al. |
| 2020/0145918 A1 | 5/2020 | Ji et al. |
| 2020/0145922 A1* | 5/2020 | Agrawal ................ H04L 1/188 |
| 2020/0336985 A1 | 10/2020 | Kim |
| 2021/0029635 A1* | 1/2021 | Meylan ................ H04W 76/28 |

* cited by examiner

DISCONTINUOUS RECEPTION WAKEUP TECHNIQUES

CROSS REFERENCE

The present Application for Patent is a Continuation of U.S. patent application Ser. No. 16/935,033 by MEYLAN et al., entitled "DISCONTINUOUS RECEPTION WAKEUP TECHNIQUES," filed Jul. 21, 2020, which claims the benefit of U.S. Provisional Patent Application No. 62/877,429 by MEYLAN et al., entitled "DISCONTINUOUS RECEPTION WAKEUP TECHNIQUES," filed Jul. 23, 2019, assigned to the assignee hereof, and expressly incorporated by reference herein.

BACKGROUND

The following relates generally to wireless communications, and more specifically to discontinuous reception (DRX) wakeup techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support UEs operating in a DRX mode. UEs in a DRX mode may transition between a sleep state for power conservation and an active state for data transmission and reception (during an ON-duration) according to a DRX configuration.

SUMMARY

The described techniques relate to improved methods, systems, devices, and apparatuses that support discontinuous reception (DRX) wakeup techniques. In accordance with various aspects, a user equipment (UE) may wake up from a sleep mode of a DRX cycle based on receipt of uplink data, and initiate a transmission to a base station prior to a scheduled ON duration of the DRX cycle and in some cases prior to receiving one or more reference signals after transitioning out of the sleep mode. In some cases, the UE may determine if an elapsed time between a prior receipt of one or more reference signals and the transmission to the base station after waking up from the sleep mode is less than a threshold time value. If the elapsed time is less than the threshold value, the UE may transmit an uplink transmission associated with the received uplink data (e.g., a scheduling request or a random access channel (RACH) request message) prior to receiving one or more reference signals that may be used to update transmission parameters for uplink transmissions. If the elapsed time is at or above the threshold value, the UE waits to receive the one or more reference signals and update the transmission parameters prior to the uplink transmission.

A method of wireless communications at a UE is described. The method may include determining a first set of parameters for wireless communications with a base station based on a first reference signal, transitioning into a sleep mode of a DRX cycle, where the DRX cycle includes an ON-duration during which the UE is to wake up from the sleep mode to monitor for transmissions from the base station, and where the UE transitions to the sleep mode after the ON-duration, identifying, while in the sleep mode, that uplink data is present for transmission from the UE, and transmitting a request to the base station for uplink resources for transmission of the uplink data, where the request is transmitted before receiving a subsequent reference signal.

An apparatus for wireless communications at a UE is described. The apparatus may include a processor, memory coupled with the processor, and instructions stored in the memory. The instructions may be executable by the processor to cause the apparatus to determine a first set of parameters for wireless communications with a base station based on a first reference signal, transition into a sleep mode of a DRX cycle, where the DRX cycle includes an ON-duration during which the UE is to wake up from the sleep mode to monitor for transmissions from the base station, and where the UE transitions to the sleep mode after the ON-duration, identify, while in the sleep mode, that uplink data is present for transmission from the UE, and transmit a request to the base station for uplink resources for transmission of the uplink data, where the request is transmitted before receiving a subsequent reference signal.

Another apparatus for wireless communications at a UE is described. The apparatus may include means for determining a first set of parameters for wireless communications with a base station based on a first reference signal, transitioning into a sleep mode of a DRX cycle, where the DRX cycle includes an ON-duration during which the UE is to wake up from the sleep mode to monitor for transmissions from the base station, and where the UE transitions to the sleep mode after the ON-duration, identifying, while in the sleep mode, that uplink data is present for transmission from the UE, and transmitting a request to the base station for uplink resources for transmission of the uplink data, where the request is transmitted before receiving a subsequent reference signal.

A non-transitory computer-readable medium storing code for wireless communications at a UE is described. The code may include instructions executable by a processor to determine a first set of parameters for wireless communications with a base station based on a first reference signal, transition into a sleep mode of a DRX cycle, where the DRX cycle includes an ON-duration during which the UE is to wake up from the sleep mode to monitor for transmissions from the base station, and where the UE transitions to the sleep mode after the ON-duration, identify, while in the sleep mode, that uplink data is present for transmission from the UE, and transmit a request to the base station for uplink resources for transmission of the uplink data, where the request is transmitted before receiving a subsequent reference signal.

Some examples of the method, apparatuses, and non-transitory computer-readable medium described herein may further include operations, features, means, or instructions for monitoring, after transmitting the request to the base station, for the subsequent reference signal, and determining a second set of parameters for wireless communications with the base station based on the subsequent reference signal. Some examples of the method, apparatuses, and non-transitory computer-readable medium described herein may further include operations, features, means, or instructions for receiving, from the base station, an uplink grant for the transmission of the uplink data, and transmitting at least a portion of the uplink data to the base station based on the uplink grant.

In some examples of the method, apparatuses, and non-transitory computer-readable medium described herein, the first reference signal and the subsequent reference signal from the base station include one or more of a synchronization signal or a tracking reference signal. Some examples of the method, apparatuses, and non-transitory computer-readable medium described herein may further include operations, features, means, or instructions for determining a first time associated with the first reference signal and a second time associated with the identifying, where the first reference signal and the subsequent reference signal may be transmitted in synchronization signal block (SSB) transmissions or tracking reference signal (TRS) transmissions of the base station, and determining an elapsed time between the first time and the second time, where the elapsed time may be measured from a receipt of an SSB or a TRS used to update the first set of parameters.

In some examples of the method, apparatuses, and non-transitory computer-readable medium described herein, transmitting the request to the base station includes transmitting the request based on the elapsed time being less than a threshold value. In some examples of the method, apparatuses, and non-transitory computer-readable medium described herein, the threshold value may be based on the elapsed time. In some examples of the method, apparatuses, and non-transitory computer-readable medium described herein, the threshold value may be based on one or more operating conditions of the UE. In some examples of the method, apparatuses, and non-transitory computer-readable medium described herein, the one or more UE operating conditions include a temperature of one or more communications components at the UE, a rate of change of one or more of the first set of parameters across two or more tracking loops, a rate of change of a distance between the UE and the base station, or any combinations thereof. Some examples of the method, apparatuses, and non-transitory computer-readable medium described herein may further include operations, features, means, or instructions for determining a specified maximum timing error of a frequency tracking loop, and selecting the threshold value based on the specified maximum timing error.

In some examples of the method, apparatuses, and non-transitory computer-readable medium described herein, the request to the base station may be transmitted using one or more of random access channel resources or physical uplink control channel resources allocated for scheduling request transmissions. In some examples of the method, apparatuses, and non-transitory computer-readable medium described herein, the first set of parameters include one or more timing parameters, gain control parameters, frequency tracking parameters, power parameters, or any combinations thereof. In some examples of the method, apparatuses, and non-transitory computer-readable medium described herein, the UE updates one or more tracking loops based on the first set of parameters.

DETAILED DESCRIPTION

Figure 1:
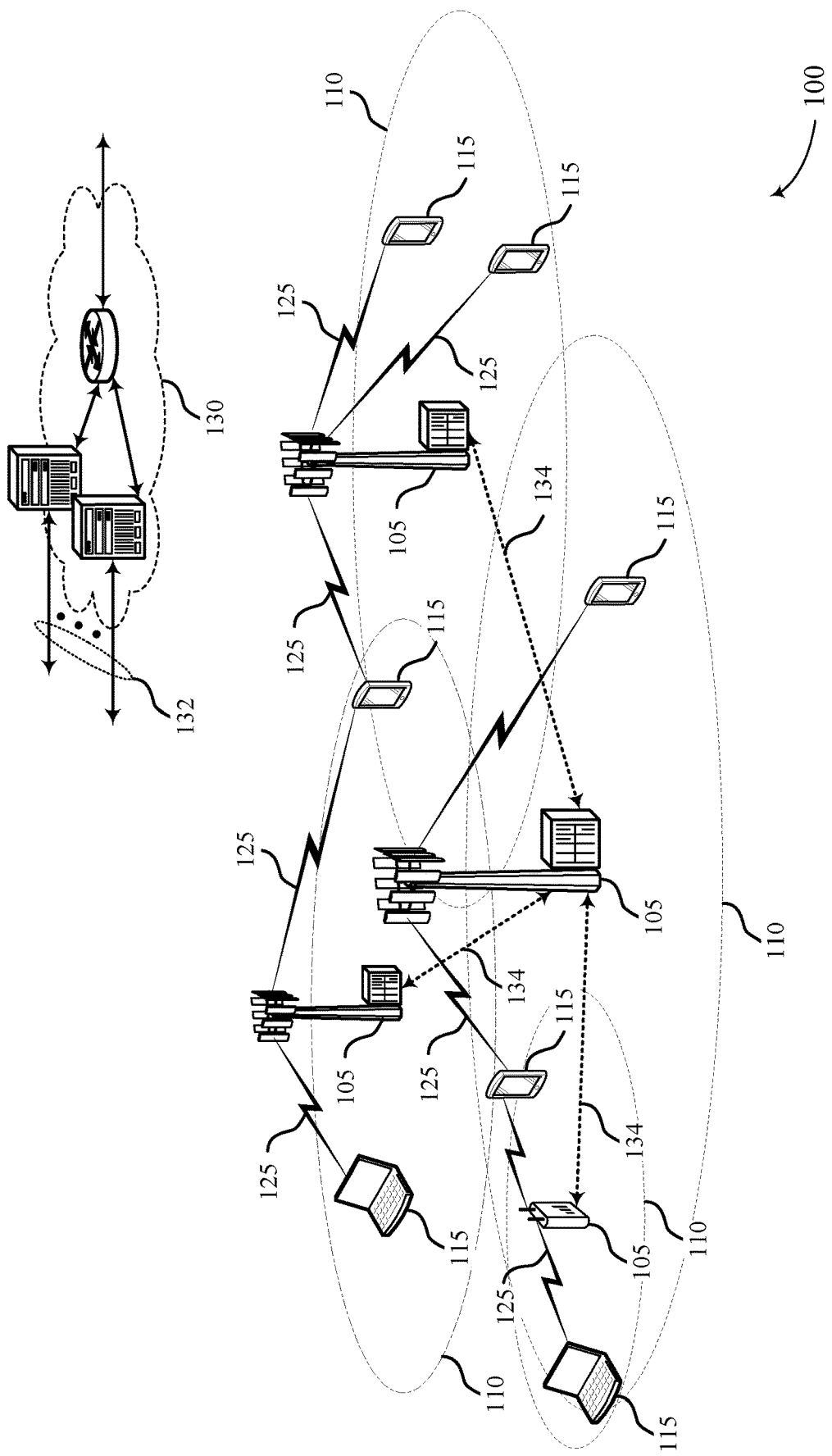
FIG. 1 illustrates an example of a system for wireless communications that supports discontinuous reception (DRX) wakeup techniques in accordance with aspects of the present disclosure.

A wireless device, such as a user equipment (UE), may implement a discontinuous reception (DRX) cycle (e.g., a connected mode DRX (C-DRX) mode) where the UE transitions between an active state (e.g., where the UE wakes up to determine if data is available for the UE) and a sleep state (e.g., where the UE shuts down various hardware/processes to conserve power). Such DRX cycles may enable the efficient use of battery power for reception of downlink transmissions. In some cases, a base station and a UE may establish a radio resource control (RRC) connection and the UE may enter a sleep state of the DRX cycle when not actively communicating with the base station. For example, during RRC connection establishment, a DRX configuration, including timing for one or more DRX-On durations, may be configured in an RRC connection setup request or an RRC connection reconfiguration request. Between successive DRX-ON durations, the UE may transition to sleep mode where one or more components of a radio frequency (RF) chain (e.g., a baseband receiver and associated amplifiers) may be powered down to help conserve power. The DRX configuration may determine how frequently the UE is scheduled to wake-up and be available for receiving downlink transmissions in accordance with the configured DRX cycle durations. It is noted that in various examples discussed herein, reference is made to the UE transitioning between sleep and awake modes with the understanding that such modes refer to sleep and awake modes for components of the RF chain, and that other components of the UE (e.g., an applications processor, user interface, etc.) may be active during such sleep and awake modes.

In some cases, in addition to the scheduled wakeup durations of the UE that are configured in the DRX cycle, the UE may also wake up at unscheduled times in response to arrival of uplink data to be transmitted from the UE. For example, a UE may be in a sleep mode of a DRX cycle and, during the sleep mode, uplink data for transmission from the UE arrives in an uplink transmission buffer (e.g., when an application running at the UE generates uplink data to be transmitted from the UE). Such unscheduled wakeup procedures may be referred to in some cases as "rude" wake ups due to their arrival during a DRX sleep cycle rudely awakening the UE. In such cases, the UE may immediately wake up and initiate a procedure to obtain uplink resources for transmission of the uplink data. For example, the UE may power on the RF components that were in sleep mode and transmit a scheduling request (SR) or a random access channel (RACH) request to obtain uplink resources to transmit the uplink data. The transmission of the SR or RACH request by the UE may provide an indication to the base station that the UE is no longer in sleep mode and that the base station can schedule communications with the UE outside of the configured DRX-ON duration.

In some cases, one or more uplink transmission parameters of the UE may become out-of-date due to the UE being in sleep mode and not keeping such parameters updated. For example, one or more of an automatic gain control (AGC) loop, a frequency tracking loop (FTL), or a power delay profile (PDP) loop at a wireless modem of the UE may be periodically updated based on one or more measurements made at the UE of one or more pilot signals or reference signals transmitted by the base station (e.g., a tracking reference signal (TRS), channel state information reference signal (CSI-RS), synchronization signal (SS) in a synchronization signal block (SSB), etc.). In some cases, the UE may update such uplink transmission parameters prior to the uplink transmission to the base station, which may enhance the likelihood of successful reception of the uplink transmission at the base station, at the cost of latency added while the UE performs the update to the uplink transmission parameters.

In accordance with various aspects of the present disclosure, a UE may determine an elapsed time since a prior update of one or more transmission parameters and may initiate an uplink SR or RACH transmission prior to a subsequent update of the transmission parameters if the elapsed time is less than a threshold value. If the elapsed time meets or exceeds the threshold value the UE may wait until the one or more parameters are updated (e.g., wait for a subsequent reference signal from the base station and associated measurement procedures to update the transmission parameters). Such techniques may allow a UE to transmit an SR or RACH request relatively quickly upon the arrival of uplink data, and thus enhance UE performance by reducing latency associated with the uplink transmission. In some cases, the threshold value may be set such that error in one or more tracking loops is likely to be relatively small and thus provide a reliable uplink transmission of the UE. Further, such techniques may allow for update of the one or more transmission parameters in parallel with the SR or RACH transmission, and thus the UE may update the uplink transmission parameters prior to uplink data transmissions that may follow the SR or RACH transmissions. Such techniques may thus provide a key performance indicator (KPI) such as "mobile originated ping latency" that is a relatively low value compared to cases where a UE always waits to update transmission parameters prior to an uplink transmission. Such KPI performance may indicate relatively efficient communications between the UE and base station while also providing relatively low power consumption at the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. Example timelines and process flows illustrating aspects of the discussed techniques are then described. Aspects of the disclosure are further illustrated by and described with reference to apparatus diagrams, system diagrams, and flowcharts that relate to DRX wakeup techniques.

FIG. 1 illustrates an example of a wireless communications system 100 that supports DRX wakeup techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, UEs 115 and base stations 105 may be configured with DRX cycles that allow one or more UEs 115 to transition to a power-saving sleep mode between ON durations of the DRX cycles. In some cases, a UE 115 may wake up from sleep mode of a DRX cycle based on receipt of uplink data, and initiate a transmission to a base station 105 prior to a scheduled ON duration of the DRX cycle and in some cases prior to updating one or more transmission parameters after transitioning out of the sleep mode. In some cases, the UE 115 initiate the transmission prior to updating the one or more transmission parameters if an elapsed time since a prior update is less than a threshold time value. If the elapsed time is less than the threshold time value, the UE 115 may transmit an uplink transmission associated with the received uplink data (e.g., an SR or RACH request message) prior to receiving one or more reference signals that may be used to update the transmission parameters. If the elapsed time is at or above the threshold value, the UE 115 may wait to receive the one or more reference signals and update the transmission parameters prior to the uplink transmission.

Figure 2:
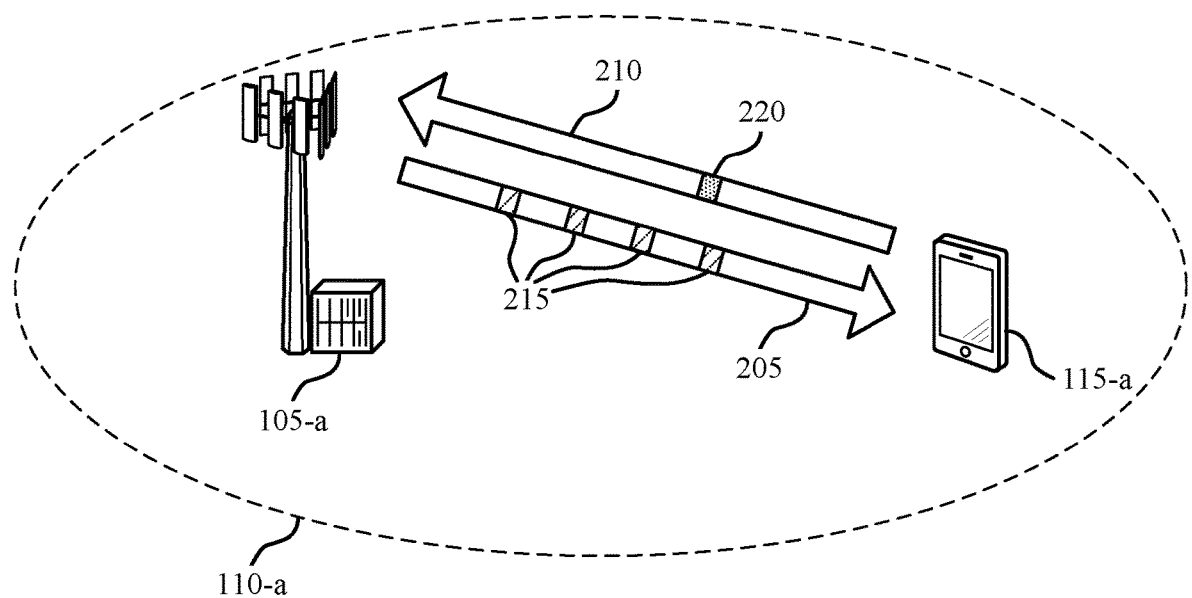
FIG. 2 illustrates an example of a portion of a wireless communications system that supports DRX wakeup techniques in accordance with aspects of the present disclosure.

FIG. 2 illustrates an example of a wireless communications system 200 that supports DRX wakeup techniques in accordance with aspects of the present disclosure. In some examples, wireless communications system 200 may implement aspects of wireless communications system 100. For example, the wireless communications system 200 may include a base station 105-a and a UE 115-a, which may be examples of the corresponding devices described with reference to FIG. 1. Some examples of the wireless communications system 200 may support DRX techniques for reduced power consumption at the UE 115-a.

The base station 105-a may provide a network coverage for UE 115-a within geographic coverage area 110-a. In some examples, UE 115-a may support DRX operation for improved power efficiency. For example, a UE 115-a may operate according to a DRX configuration in which the UE 115-a monitors for communications during periodic ON-durations, and transitions to a low power sleep mode between the periodic ON-durations. The time period between the start of each ON-duration may be referred to as a cycle duration. Further, in some cases, DRX cycles may have an identified starting location (e.g., at the start of an identified slot within a subframe), and a configurable ON-duration (e.g., 2 slots) that starts at an offset (e.g., 4 slots) relative to the identified starting location.

The base station 105-a may transmit downlink communications 205 to the UE 115-a, and the UE 115-a may transmit uplink communications 210 to the base station 105-a. In some cases, as will be discussed in more detail with respect to FIGS. 3 through 5, the base station 105-a and UE 115-a, when performing an RRC connection establishment or reestablishment, may configure a DRX configuration in which the UE 115-a may transition to a sleep mode between ON durations of the DRX cycle in order to reduce power consumption. In some cases, the UE 115-a may set one or more uplink and/or downlink transmission parameters for communications with the base station 105-a based on measurements that are made from one or more periodic pilot signals 215 that are transmitted by the base station 105-a (e.g., one or more TRS, CSI-RS, SSB transmissions, or combinations thereof). For example, the UE 115-a may maintain one or more tracking loops associated with the one or more transmission or reception parameters (e.g., one or more AGC, FTL, PDP loops, or combinations thereof) that may be updated based on measurements of the one or more periodic pilot signals 215.

In some cases as discussed herein, the UE 115-a may receive uplink data that is to be transmitted to the base station 105-a, such as in an uplink buffer of the UE 115-a. Upon receipt of the uplink data, the UE 115-a may transmit an uplink request 220 to the base station 105-a, such as an SR on a physical uplink control channel (PUCCH) or RACH request, to request uplink resources for transmission of the uplink data received in the uplink buffer of the UE 115-a. In some systems, such as in NR systems, the periodic pilot signals 215 of the base station 105-a (e.g., SSB/TRS transmissions) may be relatively scarce relative to pilots of other systems (e.g., LTE pilot signals), such as once every 20 ms. In such cases, if the UE 115-a were to wait for a subsequent periodic pilot signal 215 after arrival of uplink data in order to update its transmission/reception parameters, the UE 115-a could wait for up to 20 ms, and an average of 10 ms, which may add a significant amount of latency to the timing of the associated uplink request 220. Thus, in such cases, waiting for SSB or TRS in order to update the one or more UE 115-a tracking loops can become a dominant factor in the duration of the wakeup process.

Thus, techniques as discussed herein may provide that the UE 115-a may initiate the transmission of the uplink request 220, and/or transmission/reception of other physical channels, prior to receiving a subsequent periodic pilot signal 215 from the base station 105-a if an elapsed time since a prior tracking loop update is less than a threshold time value. If the elapsed time is at or above the threshold value, the UE 115-a may wait to receive the one or more periodic pilot signals 215 and update the transmission parameters prior to the transmission of the uplink request 220.

Figure 3A:
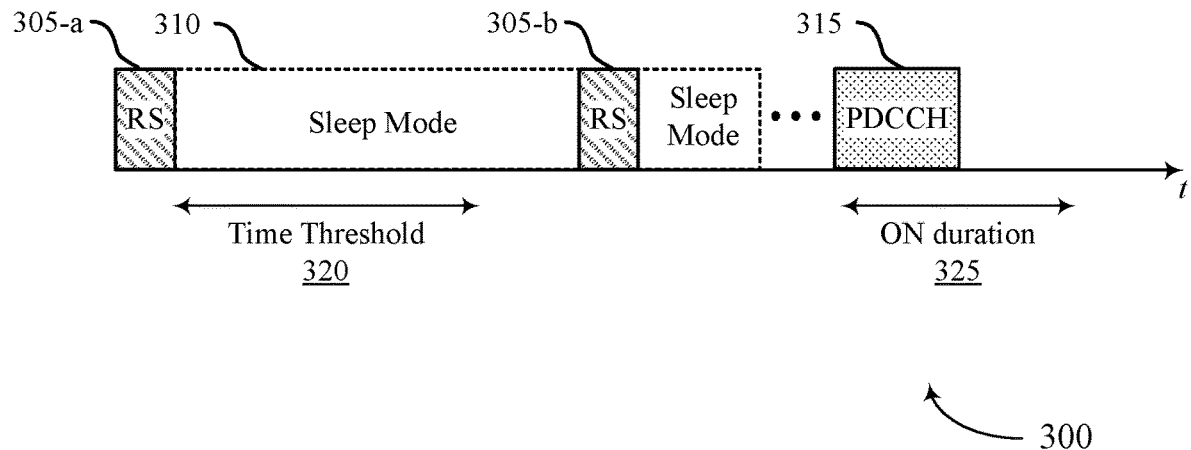
FIGS. 3A and 3B illustrate examples of uplink transmission timelines that support DRX wakeup techniques in accordance with aspects of the present disclosure.
Figure 3B:
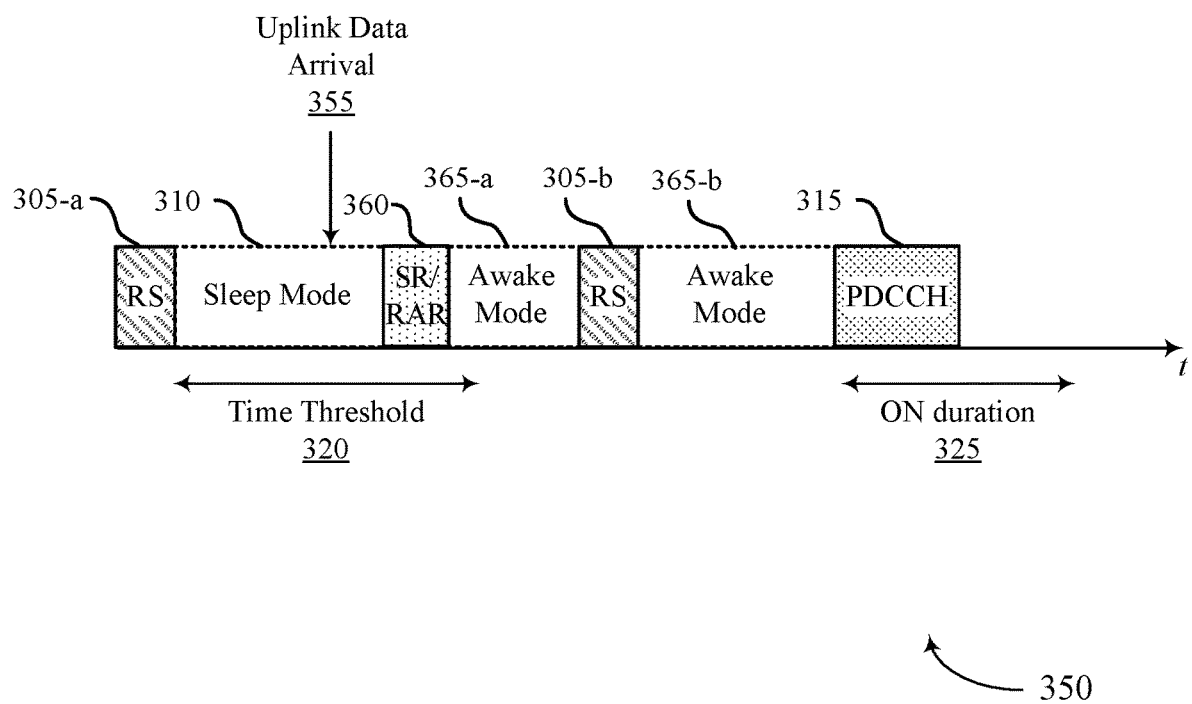

FIGS. 3A and 3B illustrate examples of uplink transmission timelines 300 and 350, respectively, that support DRX wakeup techniques in accordance with aspects of the present disclosure. In some examples, uplink transmission timeline 300 and 350 may implement aspects of wireless communications system 100 or 200. In the example of FIG. 3A, a base station (e.g., a base station 105 of FIG. 1 or 2) may transmit one or more reference signals 305 according to a configuration for periodic reference signal transmissions. In this example, a first reference signal 305-a and a second reference signal 305-b may be transmitted by the base station.

A UE that may be operating according to a DRX configuration may monitor for some or all of the periodic reference signals 305 and may update one or more uplink or downlink transmission parameters based on measurements of the periodic reference signals 305. In this example, the UE may monitor for and measure the first reference signal 305-a and may then transition to a sleep mode 310. The UE, in this example, may initiate a timer associated with the first reference signal 305-a, and a time threshold 320 may be set against the timer, where if the UE determines an uplink transmission is needed (e.g., due to receipt of uplink data for transmission), the UE may initiate an uplink transmission prior to receipt of the second reference signal 305-b, as is illustrated in FIG. 3B. In the example of FIG. 3A, the UE does not receive uplink data to be transmitted, and may remain in the sleep mode 310 until the start of ON duration 325 that is established in the DRX configuration. The UE may then monitor for a physical downlink control channel (PDCCH) downlink transmission 315 during the ON duration 325 to determine if downlink or uplink resources are configured for the UE.

In the example of FIG. 3B, after the UE transitions to sleep mode 310, the UE may identify an uplink data arrival 355 or other need to access uplink resources. For example, the UE may determine that data has arrived in an uplink transmission buffer from an application processor that is running at the UE or is otherwise connected to the UE. In this example, the uplink data arrival 355 may occur prior to the expiration of the time threshold 320, and the UE may transmit uplink transmission 360, such as an SR (e.g., if a PUCCH is configured with SR resources) or a random access request (RAR) using identified RACH resources. The uplink transmission 360 may be transmitted prior to receipt and measurement of the second reference signal 305-b based on the uplink data arrival 355 being prior to the expiration of the time threshold 320. In other cases, the uplink data arrival 355 may occur after expiration of the time threshold 320, in which case the UE may wait to receive and measure the second reference signal 305-b before the uplink transmission 360. In some cases, the starting time of the uplink transmission 360 may be compared to the time threshold 320 to determine whether the UE is to wait for the second reference signal 305-b or not. In the example of FIG. 3B, the UE may then transition to an awake mode 365 and may monitor for the second reference signal 305-*b* and perform one or more update procedures based on the second reference signal 305-*b*. The UE may, in the awake mode 365, monitor for PDCCH transmission 315, which may occur in the prior scheduled ON duration 325, or may occur prior to the scheduled ON duration 325.

In some examples, the time threshold 320 may be a time value that is selected to provide a relatively reliable uplink transmission 360 and downlink transmission 315. For example, the time threshold 320 may be a preconfigured time threshold (e.g., 320 ms) that is based on a worst-case timing drift due to temperature variation of UE components. In other cases, the time threshold 320 may be preconfigured to span a certain number of reference signal 305 transmissions (e.g., no more than 6 or 8 reference signal transmissions). In other cases, the time threshold 320 may be set based on conditions at the UE, such as based on a current temperature indicated by one or more components of the UE (e.g., a temperature indicated by an RF baseband processor, low noise amplifier (LNA) component, antenna module, etc.). For example, a first time threshold (e.g., 400 ms) may be set if the current temperature is less than a predetermined value, and a second time threshold (e.g., 320 ms) may be set if the current temperature is above the predetermined value (e.g., due to a larger amount of timing drift at higher temperatures). Thus, if a time since a prior loop update is less than the time threshold 320, the UE may skip the loop update for any common C-DRX configuration, and move directly to the uplink transmission 360.

Thus, the latency associated with the uplink transmission 360 may be improved relative to cases where the UE would wait to make an uplink transmission. For example, rather than waiting for an average of 10 ms for a SSB/TRS and then performing measurement and processing that may add additional time (e.g., an additional 5-7 ms to perform measurement, clock programming, firmware processing, and RF chain configuration), the UE may skip to the processing operations that may reduce latency, on average, by more than half relative to waiting for a subsequent SSB/TRS. As indicated herein, in some aspects, the time threshold 320 may be selected to provide a potential timing error that is relatively low and within requirements of the UE. Further, in a worst case a retransmission of the uplink transmission 360 (and/or a downlink transmission) may be required, which may still occur, on average, prior to receipt of the second reference signal 305-*b*, and thus still provide lower latency than waiting for the second reference signal 305-*b* prior to the SR/RAR transmission.

Figure 4:
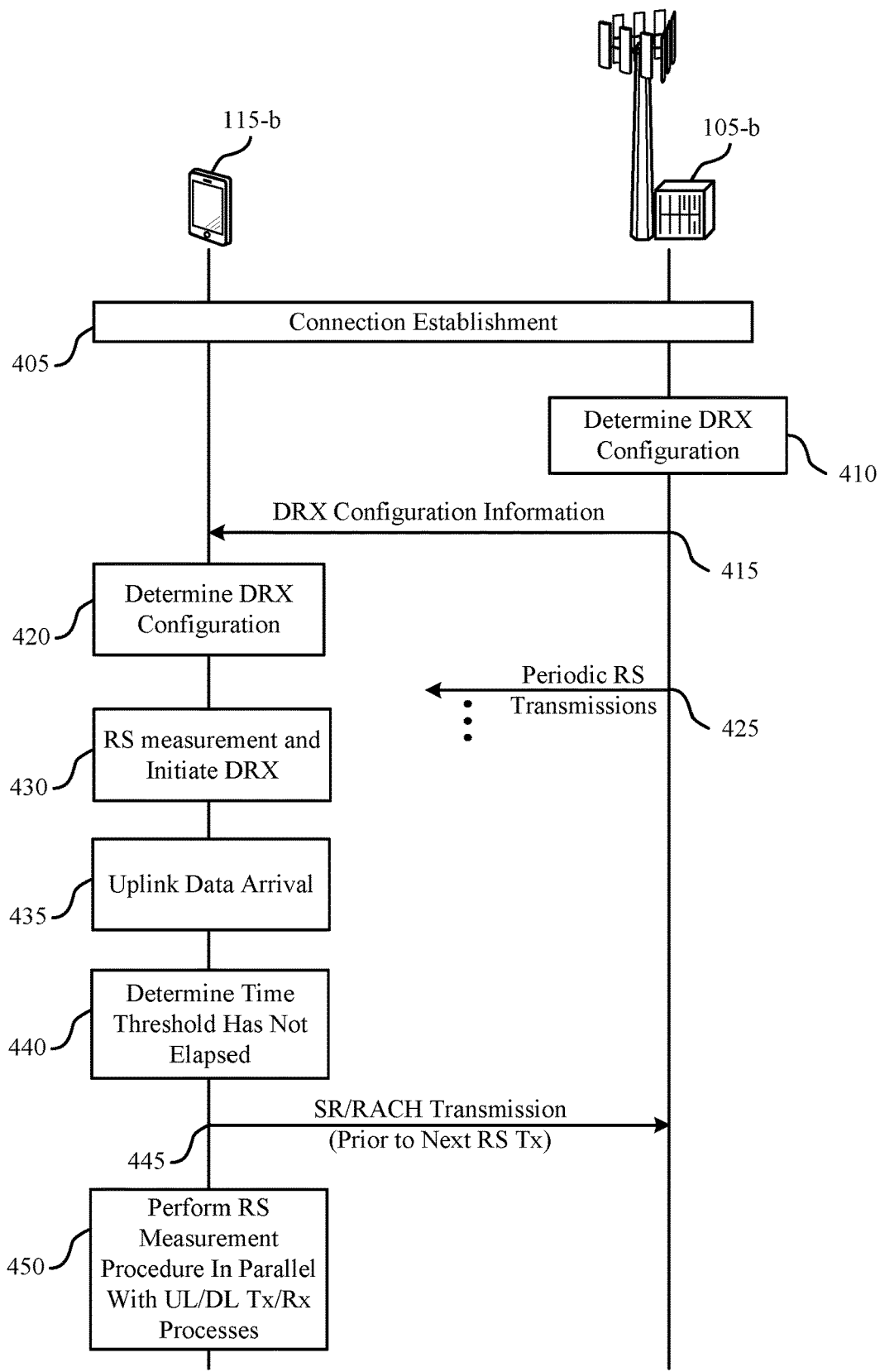
FIG. 4 illustrates an example of a process flow that supports DRX wakeup techniques in accordance with aspects of the present disclosure.

FIG. 4 illustrates an example of a process flow 400 that supports DRX wakeup techniques in accordance with aspects of the present disclosure. The process flow 400 may include a base station 105-*b* and a UE 115-*b*, which may be examples of the corresponding devices described with reference to FIGS. 1 through 3. In some examples, the process flow 400 may implement aspects of the wireless communications systems 100 and 200. For example, the base station 105-*b* and the UE 115-*b* may support DRX operations as discussed herein.

In the following description of the process flow 400, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 400, or other operations may be added to the process flow 400.

The process flow 400 may, in some examples, commence at 405 with the base station 105-*b* establishing a connection with the UE 115-*b* (e.g., performing a cell acquisition procedure, a random access procedure, an RRC connection procedure, an RRC configuration procedure).

At 410, the base station 105-*b* may determine a DRX configuration (e.g., C-DRX configuration) for the UE 115-*b*. In some cases, the base station 105-*b* may determine the DRX configuration to provide ON-durations at the UE 115-*b* that correspond with a determined traffic periodicity, which may reduce power consumption at the UE 115-*b*. At 415, the base station 105-*b* may transmit DRX configuration information to the UE 115-*b*. In some cases, the DRX configuration may be provided in RRC signaling. In some cases, as part of the connection establishment, the UE 115-*b* may indicate a capability for DRX configurations, and the base station 105-*b* may enable this capability with the DRX configuration information. Additionally or alternatively, all or part of the DRX configuration information may be provided in downlink control information (DCI) or in one or more MAC-CEs.

At 420, the UE 115-*b* may determine the DRX configuration. In some cases, the UE 115-*b* may determine the DRX configuration based on RRC signaling from the base station 105-*b*. At 425, the base station 105-*b* may transmit periodic reference signals (e.g., SSB, TRS, CSI-RS transmissions, or combinations thereof), and the UE 115-*b* may monitor for one or more of the periodic reference signals. At 430, the UE 115-*b* may perform reference signal measurements and update one or more tracking loops, and initiate DRX procedures based on the DRX configuration. Such DRX procedures may include the UE 115-*b* transitioning to a sleep mode between ON-durations, and transitioning to an awake mode to monitor for downlink transmissions from the base station 105-*b* during ON-durations.

At 435, the UE 115-*b* may detect an uplink data arrival. In some cases, the uplink data arrival may be indicated by the presence of data in an uplink transmit buffer of the UE 115-*b*. For example, an application running at an application processor associated with the UE 115-*a*, while the UE 115-*b* is in a DRX sleep mode, may generate uplink data that is to be transmitted to the base station 105-*b*. The arrival of the uplink data may cause the UE 115-*b* to transition out of the sleep mode and into an awake state for transmission of a request to obtain resources for transmission of the uplink data and reception of downlink transmissions.

At 440, the UE 115-*b* may determine that a time threshold since the prior reference signal measurement or tracking loop update has not elapsed. In some cases, such a determination may be made based on a timer that is started at each tracking loop update. In some cases, a time of a prior reference signal measurement or tracking loop update may be recorded and compared to a subsequent time associated with the uplink data arrival or expected transmission time of the uplink request to determine if the time threshold has elapsed.

At 445, based on the determination that the time threshold has not elapsed, the UE 115-*b* may transmit an uplink request, such as an SR or RACH transmission, prior to monitoring for and measuring a subsequent reference signal transmission from the base station 105-*b*. In this example, at 450, the UE 115-*b* may perform one or more reference signal measurements and update one or more transmission parameters based on tracking loop updated, in parallel with the downlink reception and uplink transmission processes.

Figure 5:
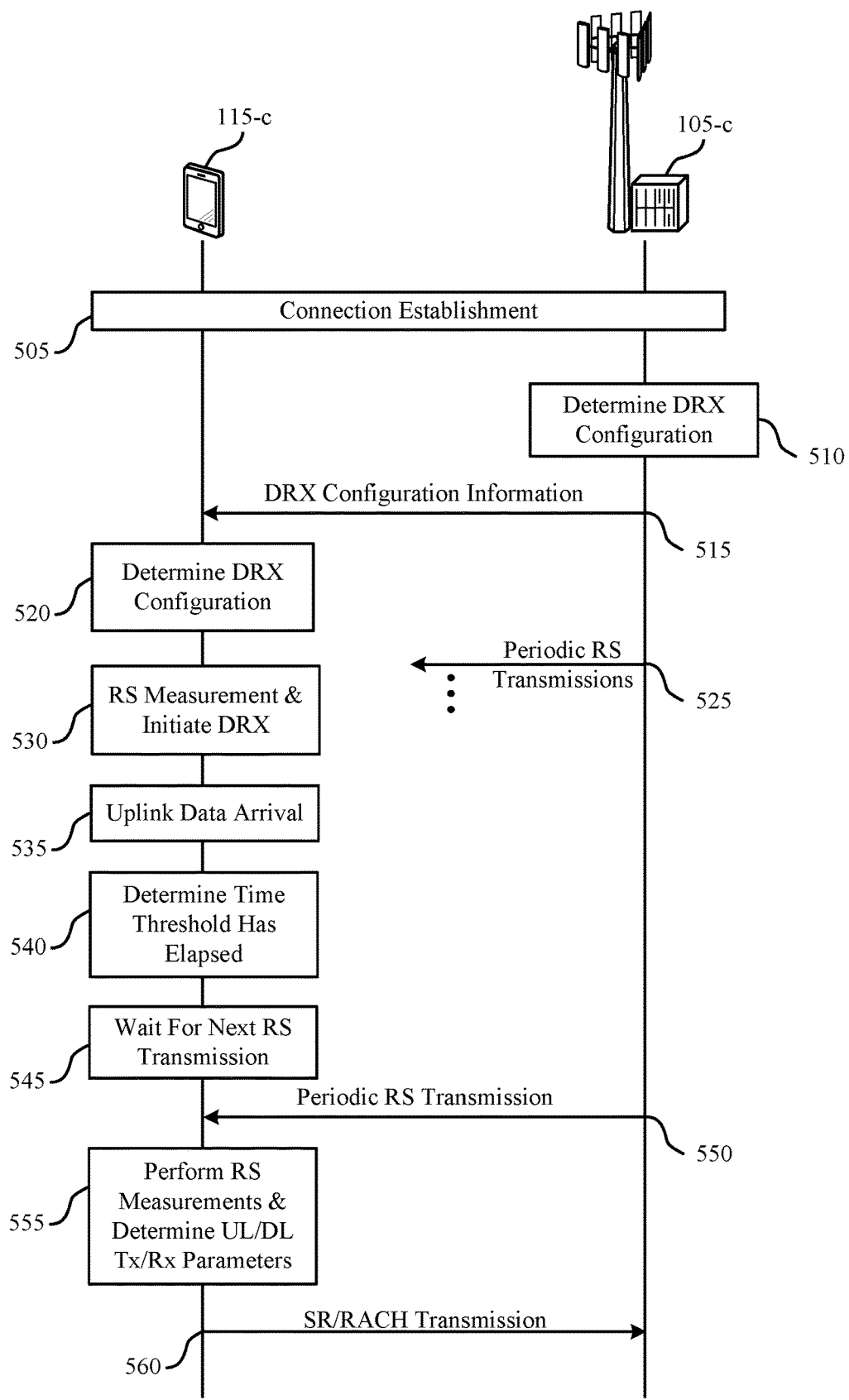
FIG. 5 illustrates an example of a process flow that supports DRX wakeup techniques in accordance with aspects of the present disclosure.

FIG. 5 illustrates an example of a process flow 500 that supports DRX wakeup techniques in accordance with aspects of the present disclosure. The process flow 500 may include a base station 105-c and a UE 115-c, which may be examples of the corresponding devices described with reference to FIGS. 1 through 4. In some examples, the process flow 500 may implement aspects of the wireless communications systems 100 and 200. For example, the base station 105-c and the UE 115-c may support DRX operations as discussed herein.

In the following description of the process flow 500, the operations between the base station 105-c and the UE 115-c may be transmitted in a different order than the exemplary order shown, or the operations performed by the base station 105-c and the UE 115-c may be performed in different orders or at different times. Certain operations may also be left out of the process flow 500, or other operations may be added to the process flow 500.

The process flow 500 may, in some examples, commence at 505 with the base station 105-c establishing a connection with the UE 115-c (e.g., performing a cell acquisition procedure, a random access procedure, an RRC connection procedure, an RRC configuration procedure).

At 510, the base station 105-c may determine a DRX configuration for the UE 115-c. In some cases, the base station 105-c may determine the DRX configuration to provide ON-durations at the UE 115-c that correspond with the determined traffic periodicity, which may reduce power consumption at the UE 115-c. At 515, the base station 105-c may transmit DRX configuration information to the UE 115-c. In some cases, the DRX configuration may be provided in RRC signaling. In some cases, as part of the connection establishment, the UE 115-c may indicate a capability for DRX configurations, and the base station 105-c may enable this capability with the DRX configuration information. Additionally or alternatively, all or part of the DRX configuration information may be provided in DCI or in one or more MAC-CEs.

At 520, the UE 115-c may determine the DRX configuration. In some cases, the UE 115-c may determine the DRX configuration based on RRC signaling from the base station 105-c. At 525, the base station 105-c may transmit periodic reference signals (e.g., SSB, TRS, CSI-RS transmissions, or combinations thereof), and the UE 115-c may monitor for one or more of the periodic reference signals. At 530, the UE 115-c may perform reference signal measurements and update one or more tracking loops, and initiate DRX procedures based on the DRX configuration. Such DRX procedures may include the UE 115-c transitioning to a sleep mode between ON-durations, and transitioning to an awake mode to monitor for downlink transmissions from the base station 105-c during ON-durations.

At 535, the UE 115-c may detect an uplink data arrival. In some cases, the uplink data arrival may be indicated by the presence of data in an uplink transmit buffer of the UE 115-c. For example, an application running at an application processor of the UE 115-a, while the UE 115-c is in a DRX sleep mode, may generate uplink data that is to be transmitted to the base station 105-c. The arrival of the uplink data may cause the UE 115-c to transition out of the sleep mode and into an awake state for transmission of a request to obtain resources for transmission of the uplink data.

At 540, the UE 115-c may determine that a time threshold since the prior reference signal measurement or tracking loop update has elapsed. In some cases, such a determination may be made based on a timer that is started at each tracking loop update. In some cases, a time of a prior reference signal measurement or tracking loop update may be recorded and compared to a subsequent time associated with the uplink data arrival or expected transmission time of the uplink request to determine if the time threshold has elapsed.

At 545, based on the determination that the time threshold has elapsed, the UE 115-c may wait for a best reference signal transmission from the base station 105-c. At 550, the base station 105-c may transmit the subsequent reference signal (e.g., SSB/TRS), which may be received at the UE 115-c.

At 555, the UE 115-c may perform reference signal measurements and determine one or more uplink/downlink transmission/reception parameters based on the reference signal measurements. At 560, the UE 115-c may transmit an uplink request, such as an SR or RACH transmission to the base station 105-c.

Figure 6:
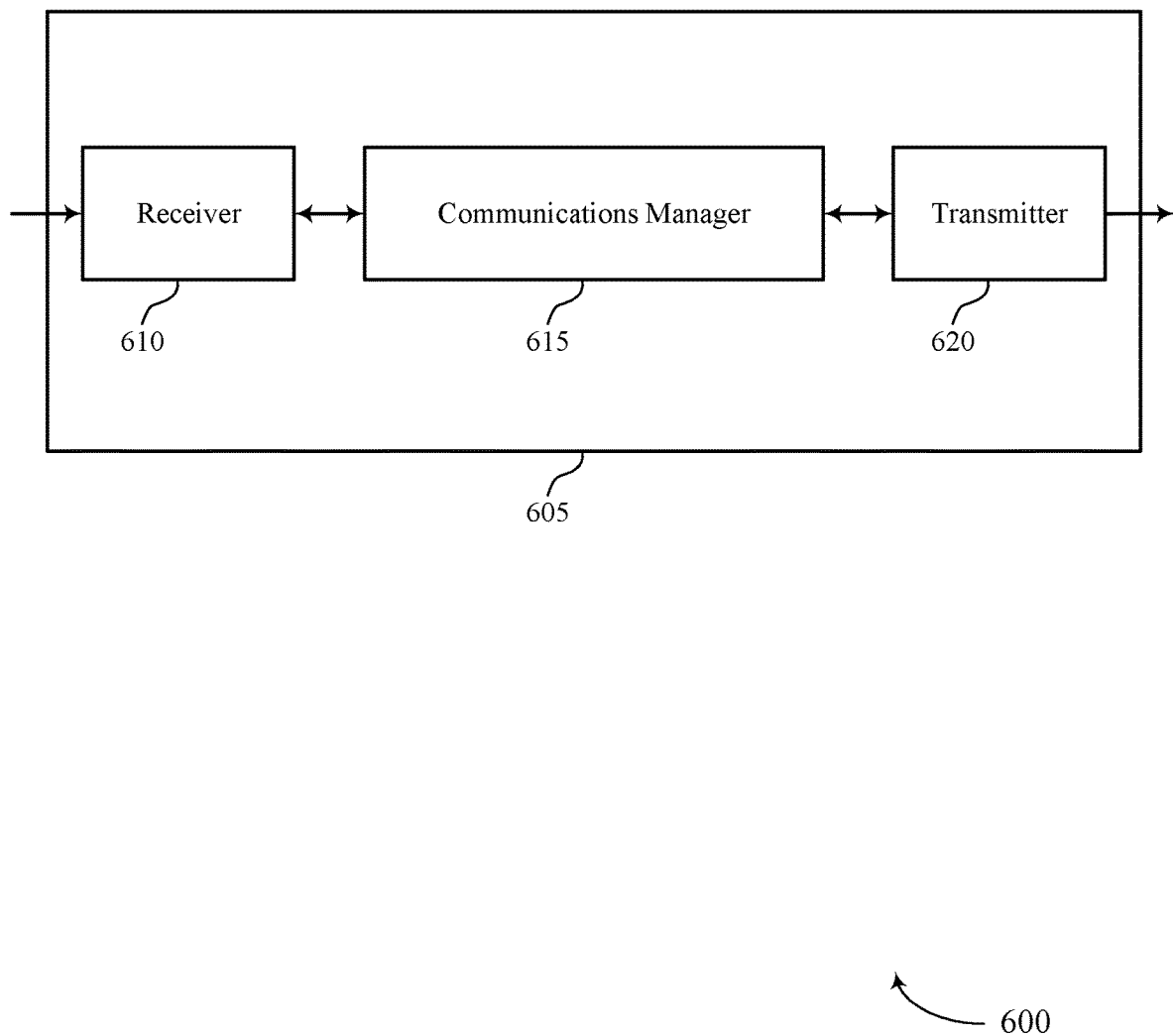
FIGS. 6 and 7 show block diagrams of devices that support DRX wakeup techniques in accordance with aspects of the present disclosure.

FIG. 6 shows a block diagram 600 of a device 605 that supports DRX wakeup techniques in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to DRX wakeup techniques, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a first set of parameters for wireless communications with a base station based on a first reference signal. In some cases, the first reference signal may be received from the base station and may be associated with a first time. The communications manager 615 may transition into a sleep mode of a DRX cycle, where the DRX cycle includes an ON-duration during which the UE is to wake up from the sleep mode to monitor for transmissions from the base station, and where the UE transitions to the sleep mode after the ON-duration. In some examples, the communications manager 615 may transition into the sleep mode after the first time. The communications manager 615 may identify, while in the sleep mode, that uplink data is present for transmission from the UE. In some cases, the identifying may be associated with a second time. In some examples, the communications manager 615 may determine an elapsed time between the first time and the second time. The communications manager 615 may transmit a request to the base station for uplink resources for transmission of the uplink data, where the request is transmitted before receiving a subsequent reference signal. In some cases, the communications manager 615 may transmit the request based on the elapsed time being less than a threshold value. In some cases, the subsequent reference signal may be received from the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The actions performed by the communications manager 615 as described herein may be implemented to realize one or more potential advantages. For example, transmitting a request to the base station for uplink resources for transmission of the uplink data before receiving a subsequent reference signal may allow the UE to decrease latency of communications between the UE and the base station. In some examples, transmitting the request to the base station before receiving the subsequent reference signal may further potentially reduce power consumption by decreasing the time a UE waits before transmitting uplink data.

A processor of the device 605 (e.g., a processor controlling the receiver 610, the communications manager 615, the transmitter 620, or a combination thereof) may reduce latency associated with transmitting uplink data by performing an unscheduled wakeup procedure. For example, by transmitting the request to the base station before receiving the subsequent reference signal, the device 605 may reduce processing overhead (e.g., time or some other overhead) associated with transmitting uplink data. Additionally or alternatively, the processor may provide for relatively low power consumption at the UE (e.g., by decreasing the time a UE waits before transmitting uplink data.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
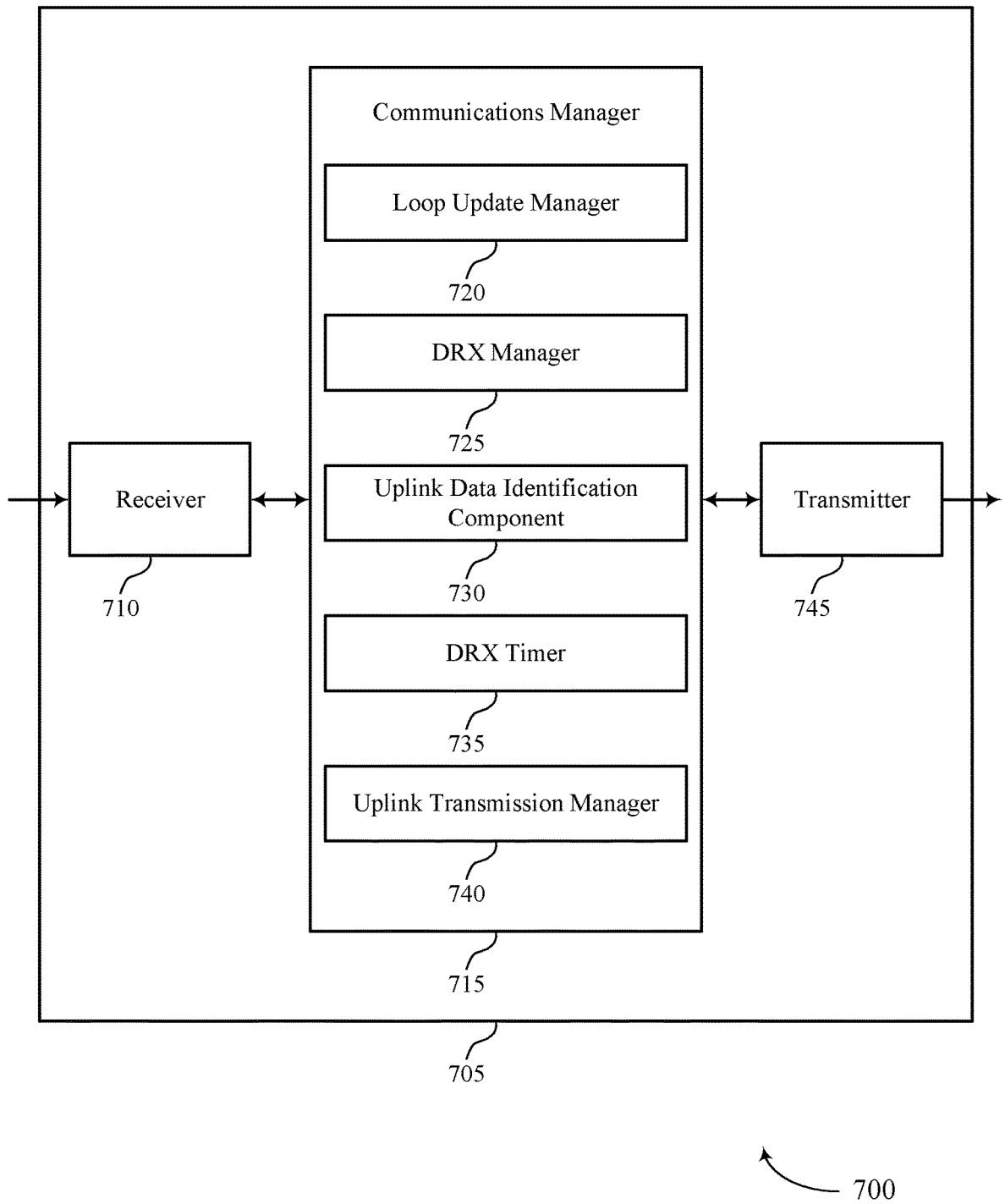

FIG. 7 shows a block diagram 700 of a device 705 that supports DRX wakeup techniques in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to DRX wakeup techniques, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a loop update manager 720, a DRX manager 725, an uplink data identification component 730, a DRX timer 735, and an uplink transmission manager 740. The communications manager 715 may be an example of aspects of the communications manager 910 described herein.

The loop update manager 720 may determine a first set of parameters for wireless communications with a base station based on a first reference signal. In some cases, the first reference signal may be received from the base station and may be associated with a first time.

The DRX manager 725 may transition into a sleep mode of a DRX cycle, where the DRX cycle includes an ON-duration during which the UE is to wake up from the sleep mode to monitor for transmissions from the base station, and where the UE transitions to the sleep mode after the ON-duration. In some cases, the DRX manager 725 may transition into the sleep mode after the first time.

The uplink data identification component 730 may identify, while in the sleep mode, that uplink data is present for transmission from the UE. In some cases, the identifying may be associated with a second time.

The DRX timer 735 may determine an elapsed time between the first time and the second time.

The uplink transmission manager 740 may transmit a request to the base station for uplink resources for transmission of the uplink data, where the request is transmitted before receiving a subsequent reference signal. In some cases, the uplink transmission manager 740 may transmit the request based on the elapsed time being less than a threshold value. In some cases, the subsequent reference signal may be received from the base station.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
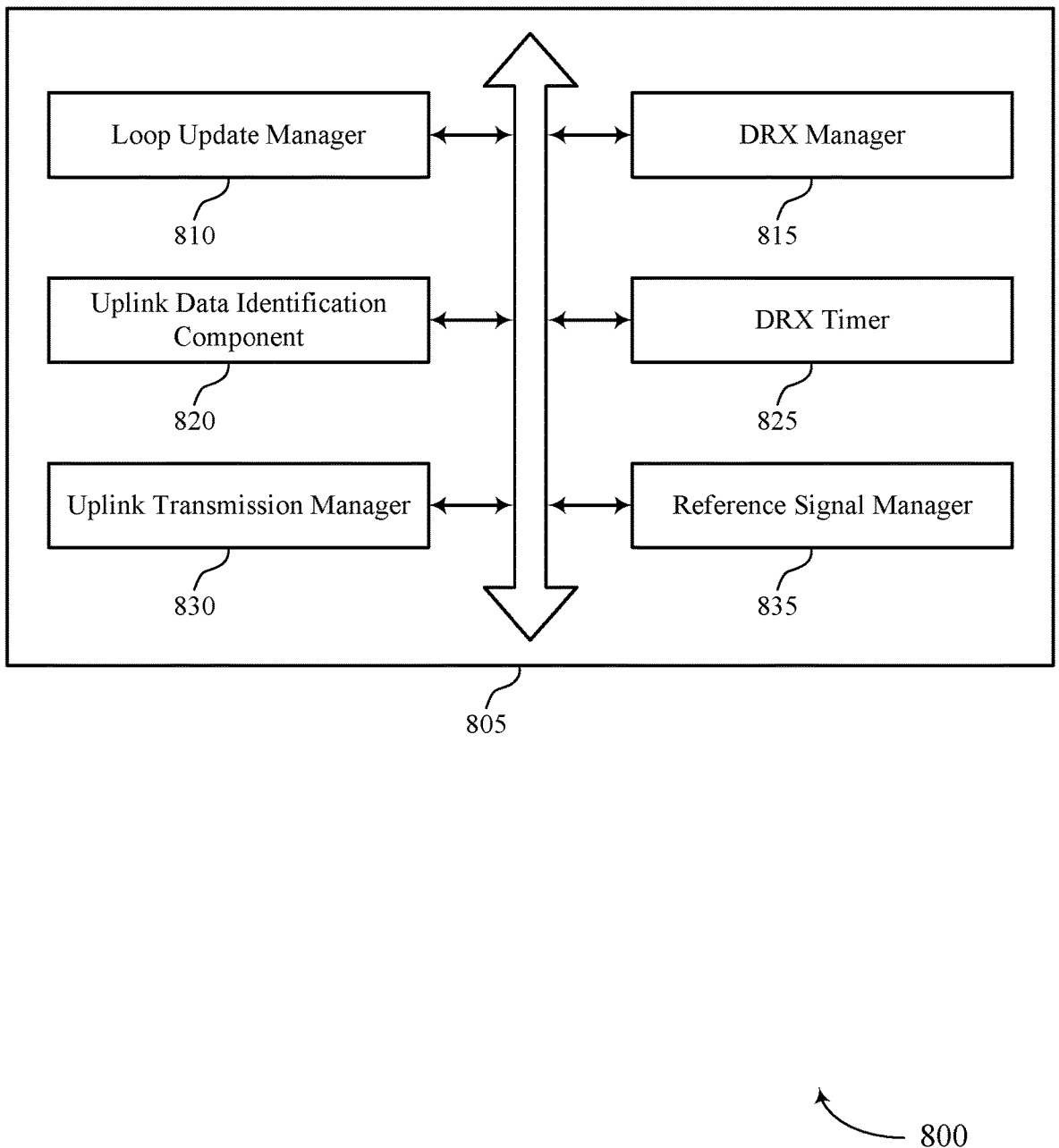
FIG. 8 shows a block diagram of a communications manager that supports DRX wakeup techniques in accordance with aspects of the present disclosure.

FIG. 8 shows a block diagram 800 of a communications manager 805 that supports DRX wakeup techniques in accordance with aspects of the present disclosure. The communications manager 805 may be an example of aspects of a communications manager 615, a communications manager 715, or a communications manager 910 described herein. The communications manager 805 may include a loop update manager 810, a DRX manager 815, an uplink data identification component 820, a DRX timer 825, an uplink transmission manager 830, and a reference signal manager 835. Each of these modules may communicate, directly or indirectly, with one another (e.g., via one or more buses).

The loop update manager 810 may determine a first set of parameters for wireless communications with a base station based on a first reference signal. In some cases, the first reference signal may be received from the base station and may be associated with a first time. In some examples, the loop update manager 810 may determine a second set of parameters for wireless communications with the base station based on a subsequent reference signal received from the base station. In some cases, the first set of parameters includes one or more timing parameters, gain control parameters, frequency tracking parameters, power parameters, or any combinations thereof. In some cases, the UE updates one or more tracking loops based on the first set of parameters.

The DRX manager 815 may transition into a sleep mode of a DRX cycle, where the DRX cycle includes an ON-duration during which the UE is to wake up from the sleep mode to monitor for transmissions from the base station, and where the UE transitions to the sleep mode after the ON-duration. In some cases, the DRX manager 815 may transition into the sleep mode after the first time.

The uplink data identification component 820 may identify, while in the sleep mode, that uplink data is present for transmission from the UE. In some cases, the identifying may be associated with a second time.

The DRX timer 825 may determine an elapsed time between the first time and the second time. In some examples, the DRX timer 825 may determine that the elapsed time exceeds or does not exceed the threshold value. In some cases, the threshold value is a predetermined time value. In some examples, the threshold value is based on the elapsed time. In some cases, the threshold value is based on one or more UE operating conditions. In some cases, the one or more UE operating conditions include a temperature of RF communications components at the UE, a rate of change of one or more of the first set of parameters across two or more tracking loops, a rate of change of a distance between the UE and the base station, or any combinations thereof. In some cases, the threshold value is selected to provide a timing error of a frequency tracking loop that is within a specified maximum timing error. In some examples, the DRX timer 825 may determine a maximum timing error of a frequency tracking loop and select the threshold value based on the maximum timing error.

The uplink transmission manager 830 may transmit, based on the elapsed time being less than a threshold value, a request to the base station for uplink resources for transmission of the uplink data, where the request is transmitted before receiving a subsequent reference signal from the base station. In some examples, the uplink transmission manager 830 may transmit, based on the elapsed time exceeding the threshold value, the request to the base station for uplink resources for transmission of the uplink data after determining a second set of parameters.

In some examples, the uplink transmission manager 830 may receive, from the base station, an uplink grant for the transmission of the uplink data. In some examples, the uplink transmission manager 830 may transmit at least a portion of the uplink data to the base station based on the uplink grant.

In some cases, the request to the base station is transmitted using one or more of random access channel resources or physical uplink control channel resources allocated for scheduling request transmissions.

The reference signal manager 835 may monitor, before or after transmitting the request to the base station, for the subsequent reference signal from the base station. In some cases, the first reference signal and the subsequent reference signal from the base station include one or more of a synchronization signal or a tracking reference signal. In some cases, the first reference signal and the subsequent reference signal are transmitted in synchronization signal block (SSB) transmissions or tracking reference signal (TRS) transmissions of the base station, and where the elapsed time is measured from a receipt of a SSB or TRS used to update the first set of parameters.

Figure 9:
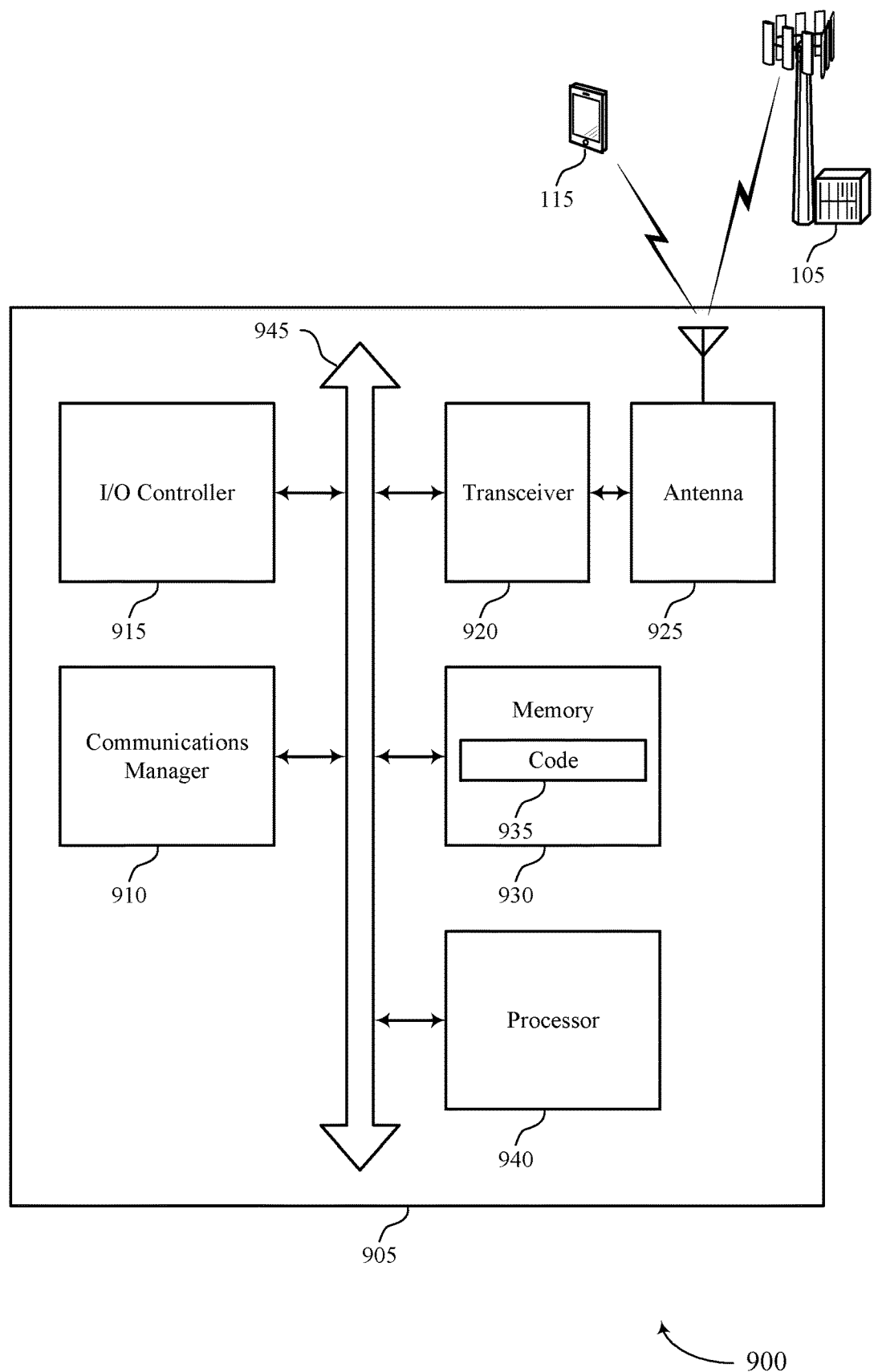
FIG. 9 shows a diagram of a system including a device that supports DRX wakeup techniques in accordance with aspects of the present disclosure.

FIG. 9 shows a diagram of a system 900 including a device 905 that supports DRX wakeup techniques in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a first set of parameters for wireless communications with a base station based on a first reference signal received from the base station that is associated with a first time, transition, after the first time, into a sleep mode of a DRX cycle, where the DRX cycle includes an ON-duration during which the UE is to wake up from the sleep mode to monitor for transmissions from the base station, and where the UE transitions to the sleep mode after the ON-duration, identify, while in the sleep mode, that uplink data is present for transmission from the UE, the identifying associated with a second time, determine an elapsed time between the first time and the second time, and transmit, based on the elapsed time being less than a threshold value, a request to the base station for uplink resources for transmission of the uplink data, where the request is transmitted before receiving a subsequent reference signal from the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting DRX wakeup techniques).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
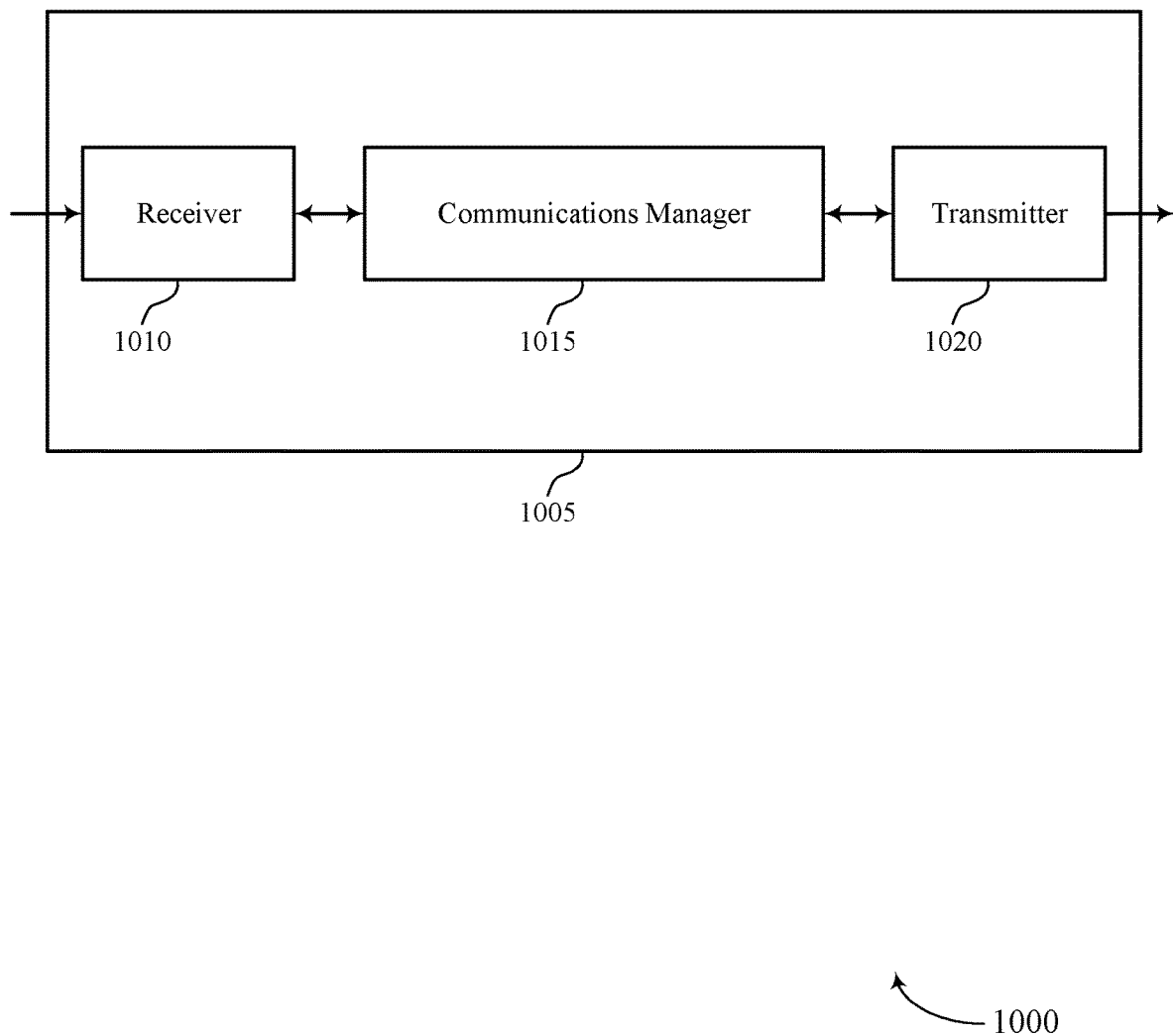
FIGS. 10 and 11 show block diagrams of devices that support DRX wakeup techniques in accordance with aspects of the present disclosure.

FIG. 10 shows a block diagram 1000 of a device 1005 that supports DRX wakeup techniques in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to DRX wakeup techniques, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure a first UE with a DRX configuration that is based on a DRX cycle that includes an ON-duration during which the UE is to wake up from a sleep mode to monitor for transmissions from the base station, discontinue the DRX configuration of the first UE, and receive, prior to an expected ON-duration, an uplink transmission from the first UE that indicates the UE has uplink data for transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
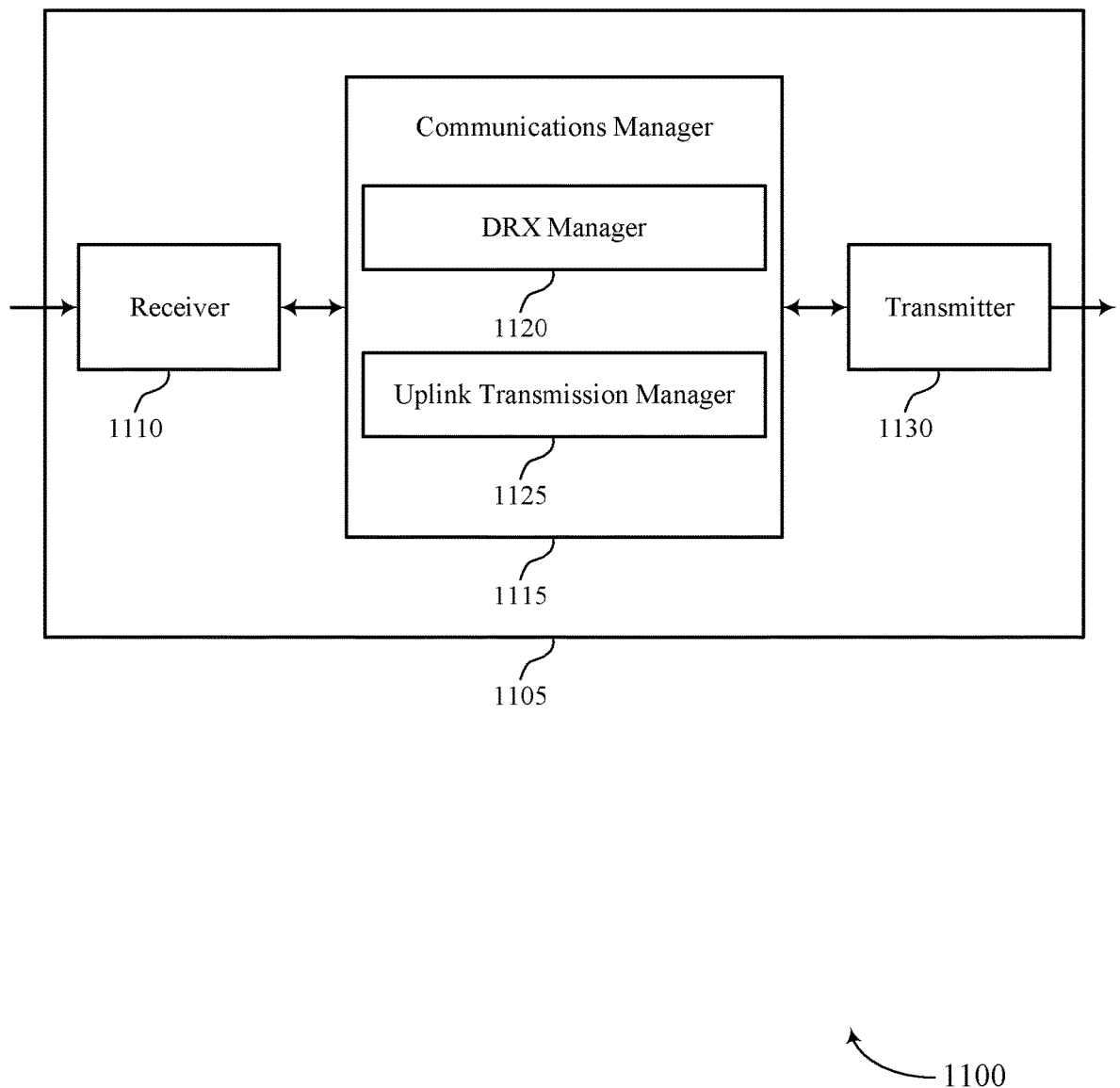

FIG. 11 shows a block diagram 1100 of a device 1105 that supports DRX wakeup techniques in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to DRX wakeup techniques, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DRX manager 1120 and an uplink transmission manager 1125. The communications manager 1115 may be an example of aspects of the communications manager 1310 described herein.

The DRX manager 1120 may configure a first UE with a DRX configuration that is based on a DRX cycle that includes an ON-duration during which the UE is to wake up from a sleep mode to monitor for transmissions from the base station and discontinue the DRX configuration of the first UE.

The uplink transmission manager 1125 may receive, prior to an expected ON-duration, an uplink transmission from the first UE that indicates the UE has uplink data for transmission.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
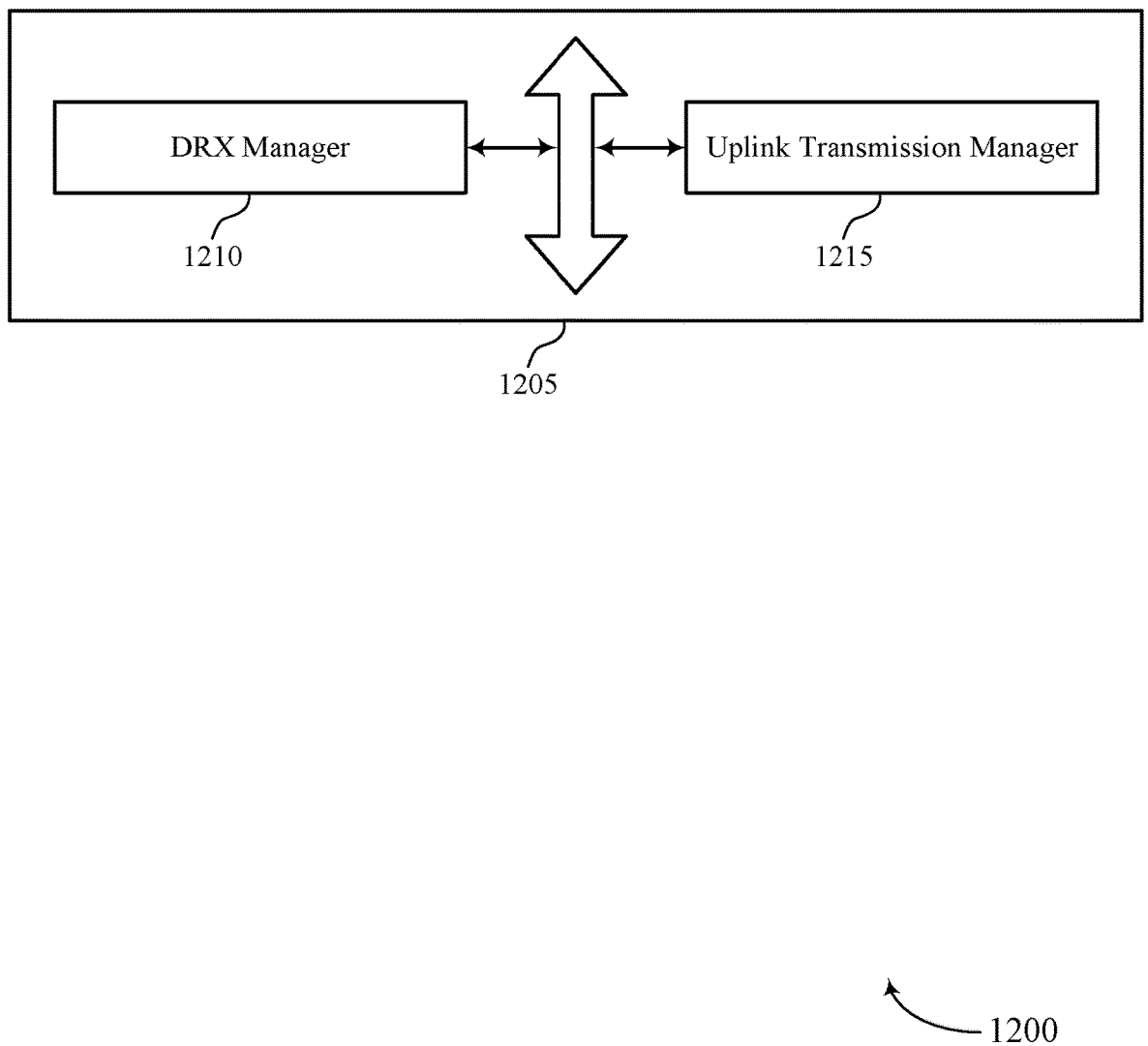
FIG. 12 shows a block diagram of a communications manager that supports DRX wakeup techniques in accordance with aspects of the present disclosure.

FIG. 12 shows a block diagram 1200 of a communications manager 1205 that supports DRX wakeup techniques in accordance with aspects of the present disclosure. The communications manager 1205 may be an example of aspects of a communications manager 1015, a communications manager 1115, or a communications manager 1310 described herein. The communications manager 1205 may include a DRX manager 1210 and an uplink transmission manager 1215. Each of these modules may communicate, directly or indirectly, with one another (e.g., via one or more buses).

The DRX manager 1210 may configure a first UE with a DRX configuration that is based on a DRX cycle that includes an ON-duration during which the UE is to wake up from a sleep mode to monitor for transmissions from the base station. In some examples, the DRX manager 1210 may discontinue the DRX configuration of the first UE. The uplink transmission manager 1215 may receive, prior to an expected ON-duration, an uplink transmission from the first UE that indicates the UE has uplink data for transmission.

Figure 13:
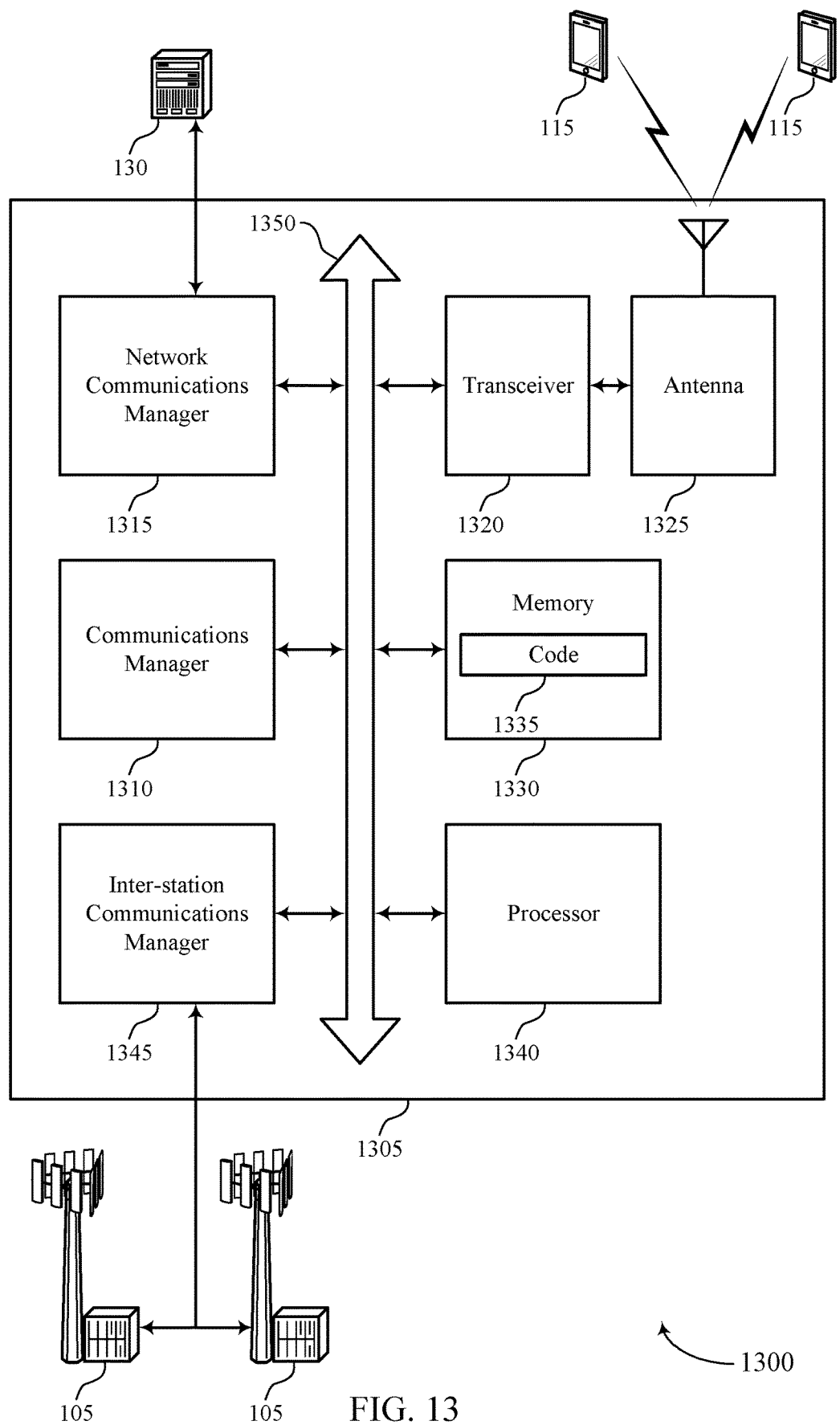
FIG. 13 shows a diagram of a system including a device that supports DRX wakeup techniques in accordance with aspects of the present disclosure.

FIG. 13 shows a diagram of a system 1300 including a device 1305 that supports DRX wakeup techniques in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure a first UE with a DRX configuration that is based on a DRX cycle that includes an ON-duration during which the UE is to wake up from a sleep mode to monitor for transmissions from the base station, discontinue the DRX configuration of the first UE, and receive, prior to an expected ON-duration, an uplink transmission from the first UE that indicates the UE has uplink data for transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting DRX wakeup techniques).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
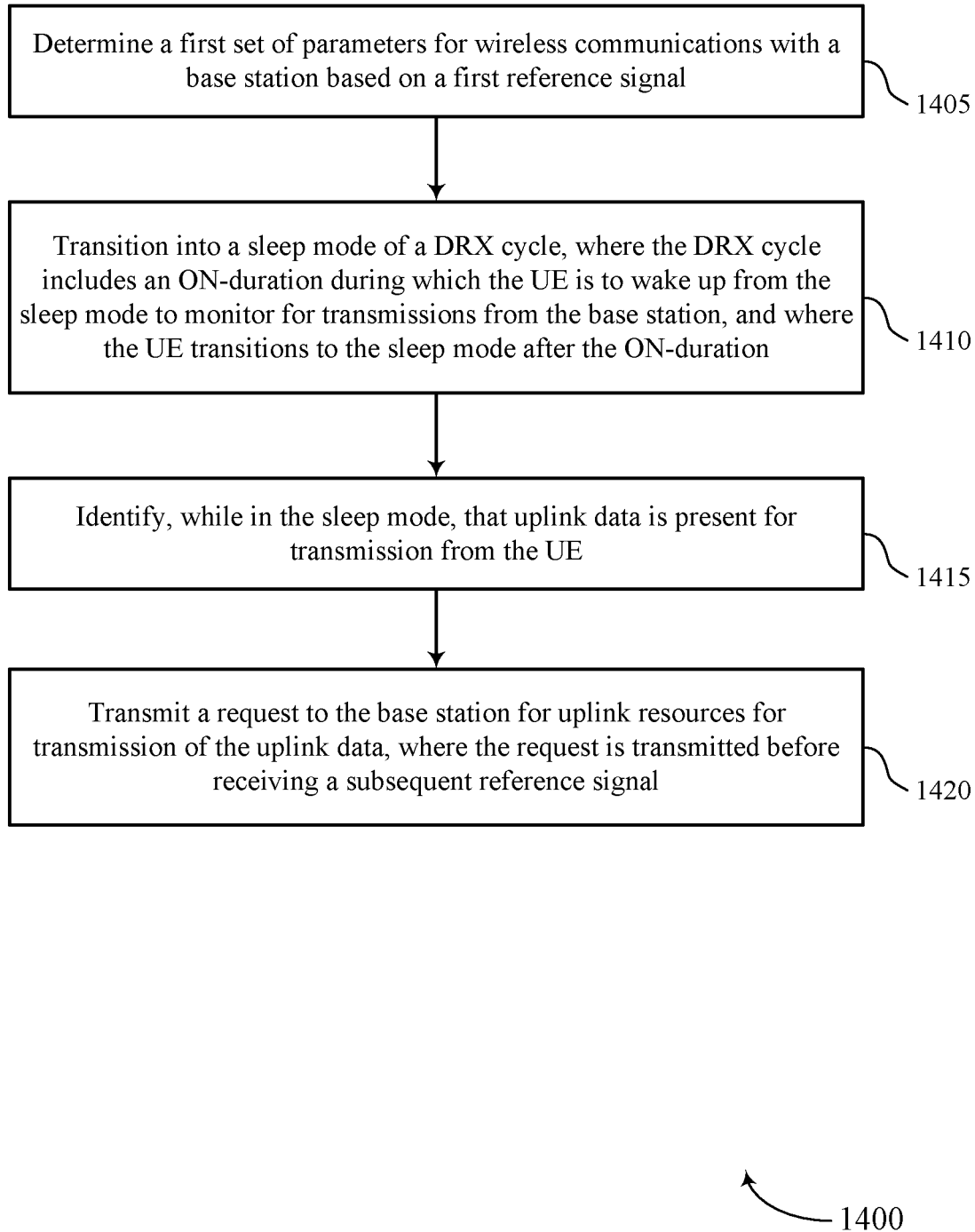
FIGS. 14 through 16 show flowcharts illustrating methods that support DRX wakeup techniques in accordance with aspects of the present disclosure.

FIG. 14 shows a flowchart illustrating a method 1400 that supports DRX wakeup techniques in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine a first set of parameters for wireless communications with a base station based on a first reference signal. The operations of 1405 may be performed according to the methods described herein. In some examples, aspects of the operations of 1405 may be performed by a loop update manager as described with reference to FIGS. 6 through 9.

At 1410, the UE may transition into a sleep mode of a DRX cycle, where the DRX cycle includes an ON-duration during which the UE is to wake up from the sleep mode to monitor for transmissions from the base station, and where the UE transitions to the sleep mode after the ON-duration. The operations of 1410 may be performed according to the methods described herein. In some examples, aspects of the operations of 1410 may be performed by a DRX manager as described with reference to FIGS. 6 through 9.

At 1415, the UE may identify, while in the sleep mode, that uplink data is present for transmission from the UE. The operations of 1415 may be performed according to the methods described herein. In some examples, aspects of the operations of 1415 may be performed by an uplink data identification component as described with reference to FIGS. 6 through 9.

At 1420, the UE may transmit a request to the base station for uplink resources for transmission of the uplink data, where the request is transmitted before receiving a subsequent reference signal. The operations of 1420 may be performed according to the methods described herein. In some examples, aspects of the operations of 1420 may be performed by an uplink transmission manager as described with reference to FIGS. 6 through 9.

Figure 15:
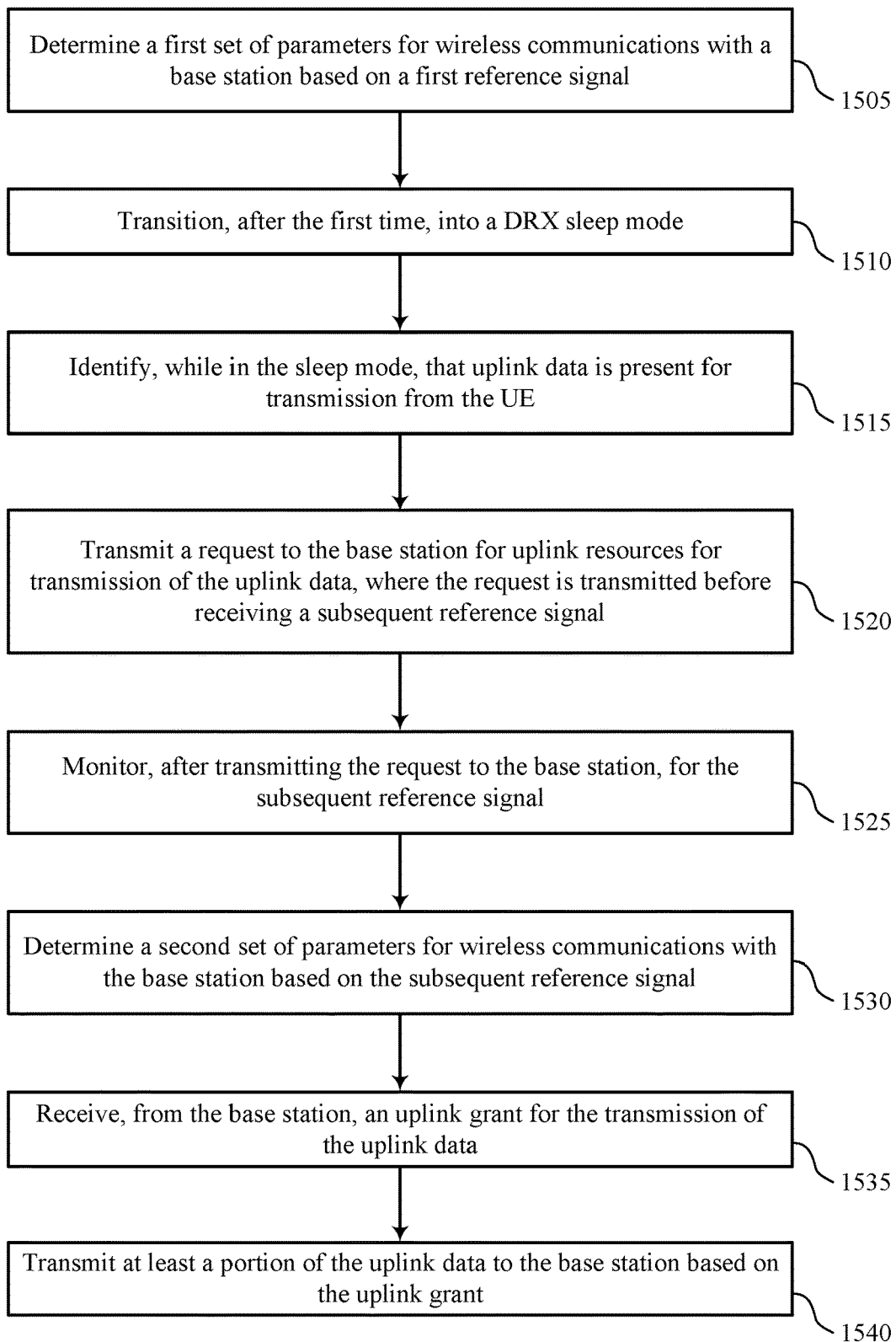

FIG. 15 shows a flowchart illustrating a method 1500 that supports DRX wakeup techniques in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine a first set of parameters for wireless communications with a base station based on a first reference signal. The operations of 1505 may be performed according to the methods described herein. In some examples, aspects of the operations of 1505 may be performed by a loop update manager as described with reference to FIGS. 6 through 9.

At 1510, the UE may transition into a sleep mode of a DRX cycle, where the DRX cycle includes an ON-duration during which the UE is to wake up from the sleep mode to monitor for transmissions from the base station, and where the UE transitions to the sleep mode after the ON-duration. The operations of 1510 may be performed according to the methods described herein. In some examples, aspects of the operations of 1510 may be performed by a DRX manager as described with reference to FIGS. 6 through 9.

At 1515, the UE may identify, while in the sleep mode, that uplink data is present for transmission from the UE. The operations of 1515 may be performed according to the methods described herein. In some examples, aspects of the operations of 1515 may be performed by an uplink data identification component as described with reference to FIGS. 6 through 9.

At 1520, the UE may transmit a request to the base station for uplink resources for transmission of the uplink data, where the request is transmitted before receiving a subsequent reference signal. The operations of 1520 may be performed according to the methods described herein. In some examples, aspects of the operations of 1520 may be performed by an uplink transmission manager as described with reference to FIGS. 6 through 9.

At 1525, the UE may monitor, after transmitting the request to the base station, for the subsequent reference signal. The operations of 1525 may be performed according to the methods described herein. In some examples, aspects of the operations of 1525 may be performed by a reference signal manager as described with reference to FIGS. 6 through 9.

At 1530, the UE may determine a second set of parameters for wireless communications with the base station based on the subsequent reference signal. The operations of 1530 may be performed according to the methods described herein. In some examples, aspects of the operations of 1530 may be performed by a loop update manager as described with reference to FIGS. 6 through 9.

At 1535, the UE may receive, from the base station, an uplink grant for the transmission of the uplink data. The operations of 1535 may be performed according to the methods described herein. In some examples, aspects of the operations of 1535 may be performed by an uplink transmission manager as described with reference to FIGS. 6 through 9.

At 1540, the UE may transmit at least a portion of the uplink data to the base station based on the uplink grant. The operations of 1540 may be performed according to the methods described herein. In some examples, aspects of the operations of 1540 may be performed by an uplink transmission manager as described with reference to FIGS. 6 through 9.

Figure 16:
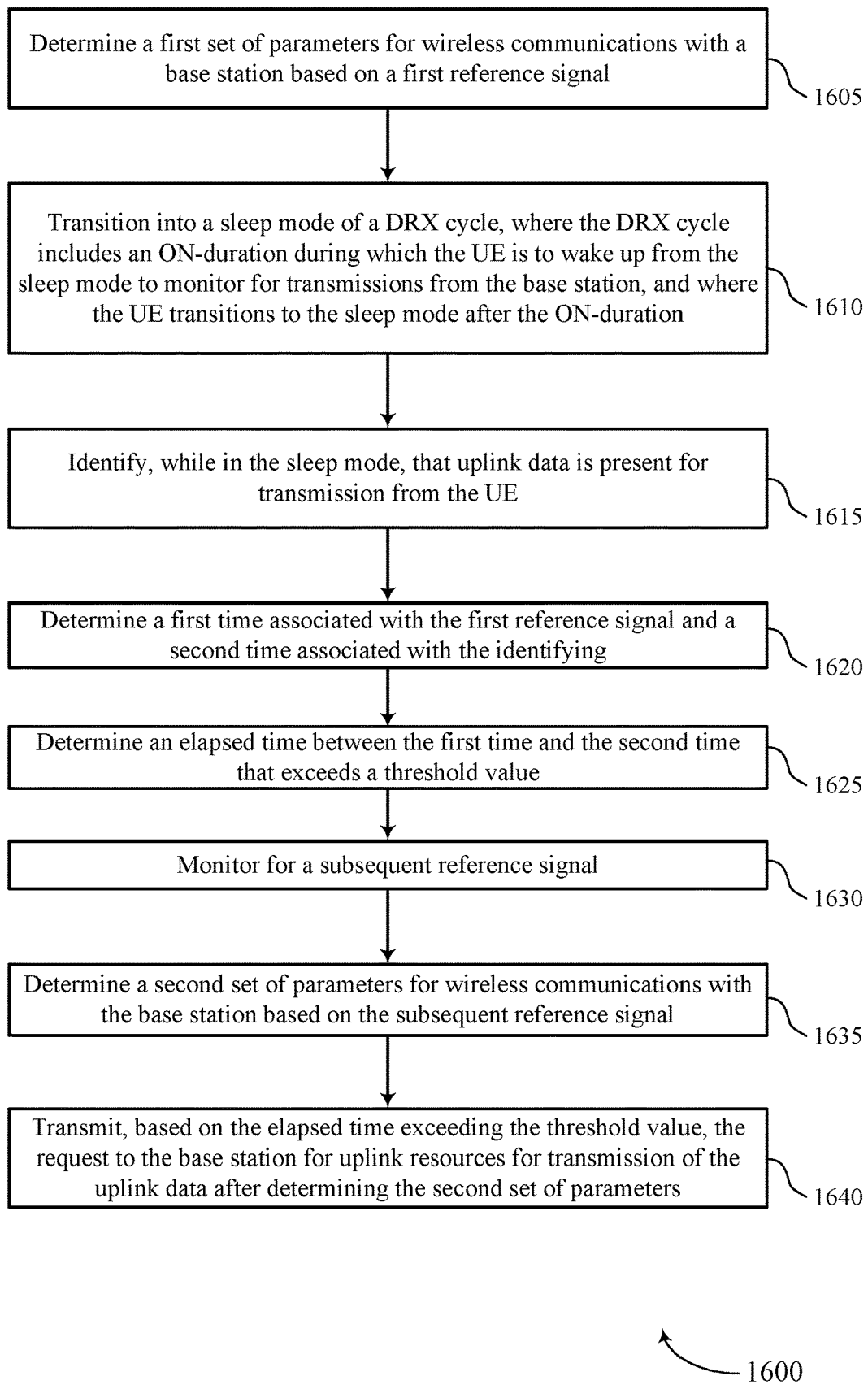

FIG. 16 shows a flowchart illustrating a method 1600 that supports DRX wakeup techniques in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine a first set of parameters for wireless communications with a base station based on a first reference signal. The operations of 1605 may be performed according to the methods described herein. In some examples, aspects of the operations of 1605 may be performed by a loop update manager as described with reference to FIGS. 6 through 9.

At 1610, the UE may transition into a sleep mode of a DRX cycle, where the DRX cycle includes an ON-duration during which the UE is to wake up from the sleep mode to monitor for transmissions from the base station, and where the UE transitions to the sleep mode after the ON-duration. The operations of 1610 may be performed according to the methods described herein. In some examples, aspects of the operations of 1610 may be performed by a DRX manager as described with reference to FIGS. 6 through 9.

At 1615, the UE may identify, while in the sleep mode, that uplink data is present for transmission from the UE. The operations of 1615 may be performed according to the methods described herein. In some examples, aspects of the operations of 1615 may be performed by an uplink data identification component as described with reference to FIGS. 6 through 9.

At 1620, the UE may determine a first time associated with the first reference signal and a second time associated with the identifying. The operations of 1620 may be performed according to the methods described herein. In some examples, aspects of the operations of 1620 may be performed by a DRX timer as described with reference to FIGS. 6 through 9.

At 1625, the UE may determine an elapsed time between the first time and the second time that exceeds a threshold value. The operations of 1625 may be performed according to the methods described herein. In some examples, aspects of the operations of 1625 may be performed by a DRX timer as described with reference to FIGS. 6 through 9.

At 1630, the UE may monitor for a subsequent reference signal. The operations of 1630 may be performed according to the methods described herein. In some examples, aspects of the operations of 1630 may be performed by a reference signal manager as described with reference to FIGS. 6 through 9.

At 1635, the UE may determine a second set of parameters for wireless communications with the base station based on the subsequent reference signal. The operations of 1635 may be performed according to the methods described herein. In some examples, aspects of the operations of 1635 may be performed by a loop update manager as described with reference to FIGS. 6 through 9.

At 1640, the UE may transmit, based on the elapsed time exceeding the threshold value, the request to the base station for uplink resources for transmission of the uplink data after determining the second set of parameters. The operations of 1640 may be performed according to the methods described herein. In some examples, aspects of the operations of 1640 may be performed by an uplink transmission manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a first reference signal;
   transitioning into a sleep mode of a discontinuous reception cycle, wherein the discontinuous reception cycle includes an ON-duration during which the UE is to wake up from the sleep mode to monitor for transmissions from a network device, and wherein the UE transitions to the sleep mode after the ON-duration; and
   transmitting, based at least in part on uplink data being present for transmission from the UE while in the sleep mode, a request to the network device for uplink resources for transmission of the uplink data, wherein the request is transmitted before reception of a subsequent reference signal and before an elapsed time that is based at least in part on the first reference signal.

2. The method of claim 1, further comprising:
   initiating a timer based at least in part on reception of the first reference signal, wherein the request is transmitted based at least in part on the uplink data being present for transmission before expiration of the timer.

3. The method of claim 1, wherein transmitting the request comprises:
   transmitting the request based at least in part on a first set of parameters for wireless communications with the network device, the first set of parameters based at least in part on the first reference signal, the method further comprising:
   monitoring, after transmitting the request to the network device, for the subsequent reference signal; and
   updating the first set of parameters to a second set of parameters for wireless communications with the network device based at least in part on the subsequent reference signal.

4. The method of claim 1, further comprising:
   receiving an uplink grant for the transmission of the uplink data; and
   transmitting at least a portion of the uplink data to the network device based at least in part on the uplink grant.

5. The method of claim 1, wherein the first reference signal and the subsequent reference signal include one or more of a synchronization signal or a tracking reference signal (TRS).

6. The method of claim 1, further comprising:
   receiving the first reference signal and the subsequent reference signal in respective synchronization signal block (SSB) transmissions or tracking reference signal (TRS) transmissions, wherein transmitting the request comprises:
   transmitting the request based at least in part on the elapsed time, wherein the elapsed time corresponds to a duration between a first time and a second time being less than a threshold value, the first time corresponding to a receipt of an SSB or a TRS used to update a first set of parameters for wireless communications with the network device, the second time corresponding to the uplink data being present for transmission.

7. The method of claim 1, wherein transmitting the request comprises:
   transmitting the request based at least in part on the elapsed time, wherein the elapsed time corresponds to a duration between a first time of the reception of the first reference signal and a second time of the uplink data being present for transmission being less than a threshold value, wherein the threshold value is based at least in part on the elapsed time.

8. The method of claim 1, wherein transmitting the request comprises:
   transmitting the request based at least in part on the elapsed time, wherein the elapsed time corresponds to a duration between a first time of the reception of the first reference signal and a second time of the uplink data being present for transmission being less than a threshold value, wherein the threshold value is based at least in part on one or more operating conditions of the UE.

9. The method of claim 8, wherein the one or more operating conditions of the UE include a temperature of one or more communications components at the UE, a rate of change of one or more of a first set of parameters for wireless communications with the network device across two or more tracking loops, a rate of change of a distance between the UE and the network device, or any combinations thereof.

10. The method of claim 1, further comprising:
selecting, based at least in part on a timing error of a frequency tracking loop, a threshold value associated with the elapsed time, wherein the elapsed time corresponds to a duration between a first time of the reception of the first reference signal and a second time of the uplink data being present for transmission, wherein the request is transmitted based at least in part on the elapsed time being less than the threshold value.

11. The method of claim 1, wherein the request to the network device is transmitted using one or more of random access channel resources or physical uplink control channel resources allocated for scheduling request transmissions.

12. The method of claim 1, wherein a first set of parameters for wireless communications with the network device determined based at least in part on the first reference signal includes one or more timing parameters, gain control parameters, frequency tracking parameters, power parameters, or any combinations thereof.

13. The method of claim 12, further comprising:
updating one or more tracking loops based at least in part on the first set of parameters.

14. An apparatus for wireless communications at a user equipment (UE), comprising:
one or more processors,
memory coupled with the one or more processors; and
instructions stored in the memory and executable by the one or more processors to cause the apparatus to:
receive a first reference signal;
transition into a sleep mode of a discontinuous reception cycle, wherein the discontinuous reception cycle includes an ON-duration during which the UE is to wake up from the sleep mode to monitor for transmissions from a network device, and wherein the UE transitions to the sleep mode after the ON-duration; and
transmit, based at least in part on uplink data being present for transmission from the UE while in the sleep mode, a request to the network device for uplink resources for transmission of the uplink data, wherein the request is transmitted before reception of a subsequent reference signal and before an elapsed time that is based at least in part on the first reference signal.

15. The apparatus of claim 14, wherein the instructions to transmit the request are executable by the one or more processors to cause the apparatus to:
initiate a timer based at least in part on reception of the first reference signal, wherein the request is transmitted based at least in part on the uplink data being present for transmission before expiration of the timer.

16. The apparatus of claim 14, wherein the instructions to transmit the request are executable by the one or more processors to cause the apparatus to:
transmit the request based at least in part on a first set of parameters for wireless communications with the network device, the first set of parameters based at least in part on the first reference signal, wherein the instructions are further executable by the one or more processors to cause the apparatus to:
monitor, after transmitting the request to the network device, for the subsequent reference signal; and
update the first set of parameters to a second set of parameters for wireless communications with the network device based at least in part on the subsequent reference signal.

17. The apparatus of claim 14, wherein the instructions are further executable by the one or more processors to cause the apparatus to:
receive an uplink grant for the transmission of the uplink data; and
transmit at least a portion of the uplink data to the network device based at least in part on the uplink grant.

18. The apparatus of claim 14, wherein the first reference signal and the subsequent reference signal include one or more of a synchronization signal or a tracking reference signal (TRS).

19. The apparatus of claim 14, wherein the instructions are further executable by the one or more processors to cause the apparatus to:
receive the first reference signal and the subsequent reference signal in respective synchronization signal block (SSB) transmissions or tracking reference signal (TRS) transmissions, wherein the instructions to transmit the request are executable by the one or more processors to cause the apparatus to:
transmit the request based at least in part on the elapsed time, wherein the elapsed time corresponds to a duration between a first time and a second time being less than a threshold value, the first time corresponding to a receipt of an SSB or TRS used to update a first set of parameters for wireless communications with the network device, the second time corresponding to the uplink data being present for transmission.

20. The apparatus of claim 14, wherein the instructions are further executable by the one or more processors to cause the apparatus to:
transmit the request based at least in part on the elapsed time, wherein the elapsed time corresponds to a duration between a first time of the reception of the first reference signal and a second time of the uplink data being present for transmission being less than a threshold value, wherein the threshold value is based at least in part on the elapsed time.

21. The apparatus of claim 14, wherein the instructions are further executable by the one or more processors to cause the apparatus to:
transmit the request based at least in part on the elapsed time, wherein the elapsed time corresponds to a duration between a first time of the reception of the first reference signal and a second time of the uplink data being present for transmission being less than a threshold value, wherein the threshold value is based at least in part on one or more operating conditions of the UE.

22. The apparatus of claim 21, wherein the one or more operating conditions of the UE include a temperature of one or more communications components at the UE, a rate of change of one or more of a first set of parameters for wireless communications with the network device across two or more tracking loops, a rate of change of a distance between the UE and the network device, or any combinations thereof.

23. The apparatus of claim 14, wherein the instructions are further executable by the one or more processors to cause the apparatus to:
  select, based at least in part on a timing error of a frequency tracking loop, a threshold value associated with the elapsed time, wherein the elapsed time corresponds to a duration between a first time of the reception of the first reference signal and a second time of the uplink data being present for transmission, wherein the request is transmitted based at least in part on the elapsed time being less than the threshold value.

24. The apparatus of claim 14, wherein the request to the network device is transmitted using one or more of random access channel resources or physical uplink control channel resources allocated for scheduling request transmissions.

25. The apparatus of claim 14, wherein a first set of parameters for wireless communications with the network device determined based at least in part on the first reference signal includes one or more timing parameters, gain control parameters, frequency tracking parameters, power parameters, or any combinations thereof.

26. The apparatus of claim 25, wherein the instructions are further executable by the one or more processors to cause the apparatus to:
  update one or more tracking loops based at least in part on the first set of parameters.

27. An apparatus for wireless communications at a user equipment (UE), comprising:
  means for receiving a first reference signal;
  means for transitioning into a sleep mode of a discontinuous reception cycle, wherein the discontinuous reception cycle includes an ON-duration during which the UE is to wake up from the sleep mode to monitor for transmissions from a network device, and wherein the UE transitions to the sleep mode after the ON-duration; and
  means for transmitting, based at least in part on uplink data being present for transmission from the UE while in the sleep mode, a request to the network device for uplink resources for transmission of the uplink data, wherein the request is transmitted before reception of a subsequent reference signal and before an elapsed time that is based at least in part on the first reference signal.

28. The apparatus of claim 27, wherein the means for transmitting the request comprise:
  means for transmitting the request based at least in part on a first set of parameters for wireless communications with the network device, the first set of parameters based at least in part on the first reference signal, the apparatus further comprising:
  means for monitoring, after transmitting the request to the network device, for the subsequent reference signal; and
  means for updating the first set of parameters to a second set of parameters for wireless communications with the network device based at least in part on the subsequent reference signal.

29. The apparatus of claim 27, further comprising:
  means for receiving an uplink grant for the transmission of the uplink data; and
  means for transmitting at least a portion of the uplink data to the network device based at least in part on the uplink grant.

30. A non-transitory computer-readable medium storing code for wireless communications at a user equipment (UE), the code comprising instructions executable by one or more processors to:
  receive a first reference signal;
  transition into a sleep mode of a discontinuous reception cycle, wherein the discontinuous reception cycle includes an ON-duration during which the UE is to wake up from the sleep mode to monitor for transmissions from a network device, and wherein the UE transitions to the sleep mode after the ON-duration; and
  transmit, based at least in part on uplink data being present for transmission from the UE while in the sleep mode, a request to the network device for uplink resources for transmission of the uplink data, wherein the request is transmitted before reception of a subsequent reference signal and before an elapsed time that is based at least in part on the first reference signal.

* * * * *